United States Patent [19]
Tobita et al.

[11] Patent Number: 5,959,440
[45] Date of Patent: Sep. 28, 1999

[54] LOAD CONTROL DEVICE FOR AN AC CIRCUIT

[75] Inventors: Koukichi Tobita; Hiroyuki Ohtsuka; Kazunori Kajitani, all of Kyoto, Japan

[73] Assignee: Omron Corporation, Japan

[21] Appl. No.: 08/904,362

[22] Filed: Aug. 1, 1997

[30] Foreign Application Priority Data

Aug. 2, 1996 [JP] Japan .................................. 8-219136
Aug. 23, 1996 [JP] Japan .................................. 8-240016

[51] Int. Cl.$^6$ .............................. G05F 1/10; G05F 1/40
[52] U.S. Cl. ......................... 323/237; 323/242; 323/288
[58] Field of Search .................................... 323/237, 239, 323/242, 288

[56] References Cited

U.S. PATENT DOCUMENTS

| | | | |
|---|---|---|---|
| 3,241,043 | 3/1966 | Clarke | 323/288 |
| 3,619,656 | 11/1971 | Domke | 323/237 |
| 3,646,439 | 2/1972 | Broski | 323/237 |
| 3,896,369 | 7/1975 | Nakata | 323/239 |
| 4,668,908 | 5/1987 | Aoki et al. | 323/239 |
| 4,743,834 | 5/1988 | Rice | 323/239 |

*Primary Examiner*—Peter S. Wong
*Assistant Examiner*—Bao Q. Vu
*Attorney, Agent, or Firm*—Morrison & Foerster

[57] ABSTRACT

A motor controlling device for controlling the rotational speed of an AC motor (3) connected with an AC power supply (1) through a speed control thyrister (2) includes a negative charging circuit (5) for charging a negative half cycle voltage of the AC power supply (1) in a negative direction for each cycle to trigger the thyrister (2) in a positive half cycle period of the AC power supply (1), and a positive charging circuit (6) for charging a positive half cycle voltage of the AC power supply (1) in a positive direction from the end of the negative half cycle by the negative charging circuit (5) for each cycle to trigger the thyrister (2) when the charged voltage reaches a trigger voltage of the thyrister (2).

9 Claims, 18 Drawing Sheets

F I G. 1
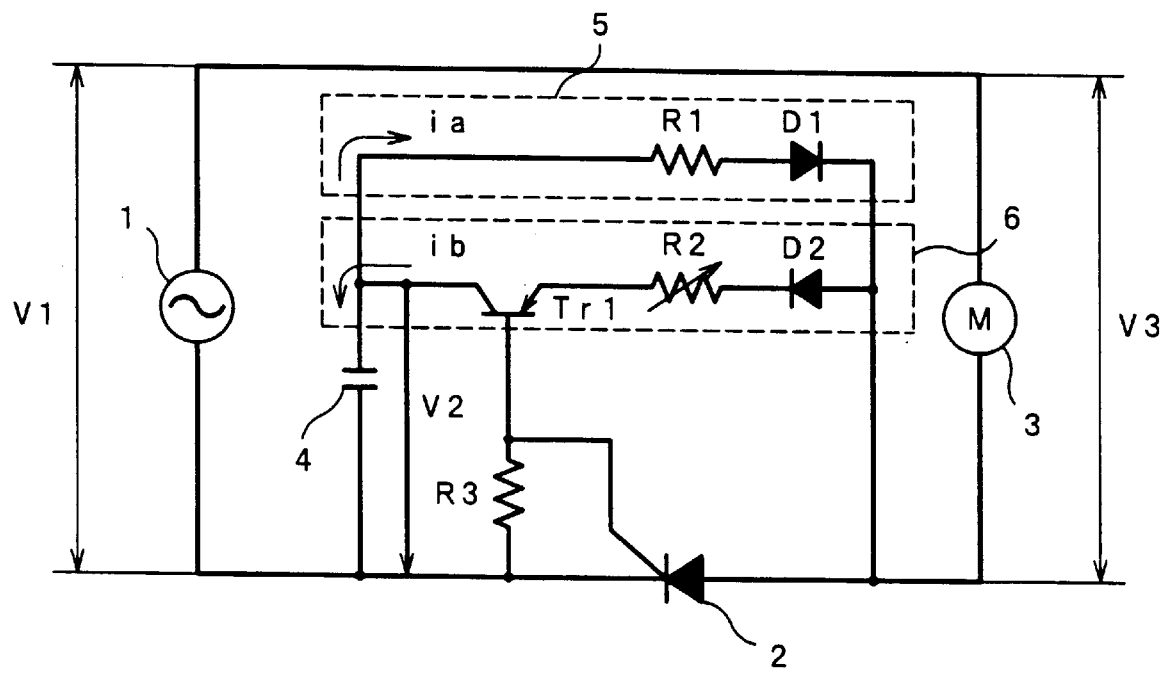

LOAD CONTROL DEVICE FOR AN AC CIRCUIT

BACKGROUND OF THE INVENTION

1. Field of the Invention

This invention relates to a load control device for controlling a load such as an electric motor or the like applied to a power tool, and more particularly to an improved load control device capable of correcting a conductive angle of an switching element controlled in a phase control fashion in accordance with a variation of a power supply frequency.

2. Discussion of the Related Art

Referring to FIG. 16, there is shown a circuit block diagram of a conventional motor control circuit used for controlling a speed of an AC motor employed in power tools. An AC motor M and a thyrister SCR for controlling a speed of the motor are connected in series across an AC power supply "e". Across the AC power supply "e" there is connected a series circuit of a variable resistance VR and a capacitor C to provide a phase control circuit for a half wave of the thyrister SCR.

Across the capacitor C there are connected a gate and a cathode of the thyrister SCR through a diode D. An on-and-off switch SW is connected across the thyrister SCR to short the same so as to apply a full voltage of the AC power supply to the AC motor M for a full rotational speed.

As a positive half cycle voltage 121 is applied from the AC power supply "e", a voltage charged in the capacitor C varies as shown in a curve 122 according to a time constant with the variable resistance VR. When the charged voltage of the capacitor C reaches the gate-trigger voltage Vg of the thyrister SCR, the thyrister SCR is turned ON and after then a power shown in a hatched domain of the positive half cycle is applied to the motor M for rotations.

As the variable resistance VR is varied to increase or decrease the resistance, the time constant varies so that the inclination of the charging curve 122 of the capacitor C varies downward or upward and a conductive angle of current flowing through the thyrister SCR decreases or increases (a variation to decrease or increase of the hatched domain in the positive half cycle), whereby the rotational speed of the AC motor is controlled.

The conventional motor control circuit described above employing the phase control circuit composed of the variable resistance VR and the capacitor C has the disadvantage that as the line frequency of the AC power supply "e" varies between 50 Hz and 60 Hz, the charging characteristics (the time constant) of the capacitor C does not vary but the conductive angle of the thyrister SCR varies in accordance with the variations of the line frequency whereby a stable motor speed control cannot be expected.

As shown in FIG. 18 at (a), in the respective positive half cycles of a voltage wave form 131 of the line frequency 60 Hz and a voltage wave form 132 of the line frequency 50 Hz, the charging curve 133 of the capacitor C remains constant irrelevant to the line frequencies but the conductive angle of the thyrister SCR varies. When the charged voltage in the capacitor C reaches the gate-trigger Vg of the thyrister SCR, the conductive domain of the thyrister SCR of 50 Hz shown in FIG. 18 at (c) becomes larger than that of 60 Hz shown in FIG. 18 at (b).

Accordingly, as the same quantity of manipulation is applied to the variable resistance VR to change its resistance, the rotational speed of the AC motor at 50 Hz is faster than that at 60 Hz. It is disadvantageous in operations that the same power tool varies with the change of line frequencies. For instance, when the rotational speed of the motor M is controlled by continuously varying the resistance of the variable resistance VR in link motion with the stroke manipulation of a switch employed in the power tool, the relationship between stroke of the switch and rotational speed of the motor in the line frequencies of 60 Hz and 50 Hz is shown in FIG. 19.

There appears a large difference between speed change domains of the line frequencies 60 Hz and 50 Hz, so that the stroke manipulation of the switch must be changed in accordance with the line frequencies, resulting in an inconvenient operation of the power tool.

SUMMARY OF THE INVENTION

It is, therefore, a primary object of this invention to provide an improved load control device capable of correcting a conductive angle of a switching element controlling a conduction to a load in accordance with variations of power supply frequencies to provide a stable power supply with regulating affection of the variations of the power supply frequencies.

According to a first aspect of this invention, there is provided a load control device for controlling a current in a load connected with an AC power supply through a switching element which includes a negative charging circuit for charging a negative half cycle voltage of the AC power supply in a negative direction for each cycle to trigger the element in a positive half cycle period of the AC power supply, and a positive charging circuit for charging a positive half cycle voltage of the AC power supply in a positive direction from the end of the negative half cycle by the negative charging circuit for each cycle to trigger the element when the charged voltage reaches a trigger voltage of the switching element.

According to this aspect, the negative charging circuit charges the negative half cycle voltage of the AC power supply in the negative direction for each cycle and the positive charging circuit charges the positive half cycle voltage of the AC power supply in the positive direction from the end of the negative half cycle by the negative charging circuit for each cycle to trigger the switching element when the charged voltage reaches the gate-trigger voltage of the element, whereby the conductive angle of the switching element may be corrected in accordance with the variations of line frequencies and the changes of supplied power by the variations of line frequencies may be regulated. When the load is an electric motor, the control of a stable speed may be expected.

According to a second aspect of this invention, there is provided a load controlling device according to the first aspect in which the negative charging circuit includes a limiter circuit for limiting the negative charged voltage.

According to this aspect, any negative voltage exceeding a withstanding voltage of the negative charging circuit is avoided to be charged, whereby the negative charging circuit is protected from destruction and the capacity of the circuit can be minimized.

According to a third aspect of this invention, there is provided a load controlling device according to the first or second aspect in which the positive charging circuit includes a constant voltage circuit for keeping the current constant which the positive charging circuit charges in a positive direction when the voltage of the AC power supply drops.

According to this aspect, the power supplied to the load is stabled even if the power supply voltage varies to a drop.

When the load is an AC motor, its rotational speed is stably controlled without affection by variations of voltages.

According to a fourth aspect of this invention, there is provided a load controlling device according to the first or third aspect in which the positive charging circuit includes a variable resistance.

According to a fifth aspect of this invention, there is provided a load controlling device according to the first or fourth aspect claim 1 or 4 in which the positive charging circuit includes a circuit logarithmically changing a resistance value including the same of the variable resistance.

According to the fourth or fifth aspect of this invention, the driving characteristics of the load may be non-linear. For instance, if the load is an AC motor, the rotational speed of the motor is provided with downwardly curved characteristics in which the ratio of speed at the rise of the motor may be small and the manipulation of its power tools may be improved.

According to a sixth aspect of this invention, there is provided a load controlling device according to the first aspect in which the switching element is composed of a main switching element for switching a power supply circuit of the load and a auxiliary switching element for turning on the main switching element.

According to this aspect of this invention, the gate current of the switching element is minimized and a current consumed by the positive charging circuit is decreased to reduce its heat.

According to a seventh aspect of this invention, there is provided a load controlling device according to the sixth aspect in which a trigger element which is conducted by the charging voltage of the positive charging circuit is used to trigger the switching element.

According to this aspect, the gate current of the switching element is minimized, and a current consumed by the positive charging circuit is reduced, resulting into reduction of its heat.

According to an eighth aspect of this invention, there is provided a load controlling device according to the first aspect further including a capacitor to apply a conductive reference voltage to the switching element, in which the negative charging circuit includes a diode connected in a direction to charge the capacitor with a negative voltage, and the positive charging circuit includes a diode connected in a direction to charge the capacitor with a positive voltage and a transistor a base terminal of which is connected with a gate terminal of the switching element.

According to this aspect, the stable power supply applied to the load little affected by the variations of the power line frequencies is performed by a simplified circuit construction. When the load is an electric motor, the control of a stable rotational speed is enabled. A positive half cycle voltage of the AC power supply is charged in a positive direction after a negative half cycle voltage of the AC power supply is charged by the negative charging circuit in order to trigger the switching element based on the positively charged voltage, but, reversely, the negative voltage may be charged in the negative direction after the positive voltage of the power supply is charged in the positive direction in order to trigger the switching element based on the negatively charged voltage.

According to a ninth aspect of this invention, there is provided a motor control device for controlling the rotational speed of an AC motor connected with an AC power supply through a bidirectional switching element, which includes a first positive charging circuit for charging in a positive direction in a positive half cycle of said AC power supply for each cycle, a first negative charging circuit for charging in a negative direction in a negative half cycle of the AC power supply from the end of charge of the positive half cycle by the first positive charging circuit for each cycle to trigger the bidirectional switching element when the charged voltage reaches a gate-trigger voltage of the bidirectional switching element, a second negative charging circuit for charging in a negative direction in a negative half cycle of said AC power supply for each cycle, and a second positive charging circuit for charging in a positive direction in the positive half cycle of the AC power supply from the end of charge in the negative half cycle by the second negative charging circuit for each cycle to trigger the bidirectional switching element when the charged voltage reaches the gate-trigger voltage of the bidirectional switching element, whereby the bidirectional switching element is triggered in the positive and negative half cycles of the AC power supply.

According to this aspect, the first negative charging circuit charges in a negative direction in a negative half cycle of the AC power supply from the end of charge of the positive half cycle by the first positive charging circuit for each cycle, the second positive charging circuit charges in a positive direction in the positive half cycle of the AC power supply from the end of charge in the negative half cycle by the second negative charging circuit charging in a negative direction in a negative half cycle of the AC power supply and the bidirectional switching element is triggered synchronously with the positive and negative half cycle wave forms at a conductive angle when the charged voltages reaches the gate-trigger voltages of the bidirectional switching element, whereby the conductive angle of the bidirectional switching element is corrected in accordance with the variations of the power line frequencies and a stable control of the rotational speed of the AC motor is performed without affection by the line frequencies with respect to the rotational speed.

BRIEF DESCRIPTION OF THE DRAWINGS

Other objectives and advantages of this invention will be more readily apparent from the following detailed description provided in conjunction with the following figures, of which:

FIG. 1 is a circuit block diagram of a load control device as a first embodiment of this invention.

DETAILED DESCRIPTION OF THE INVENTION

Figure 2A:
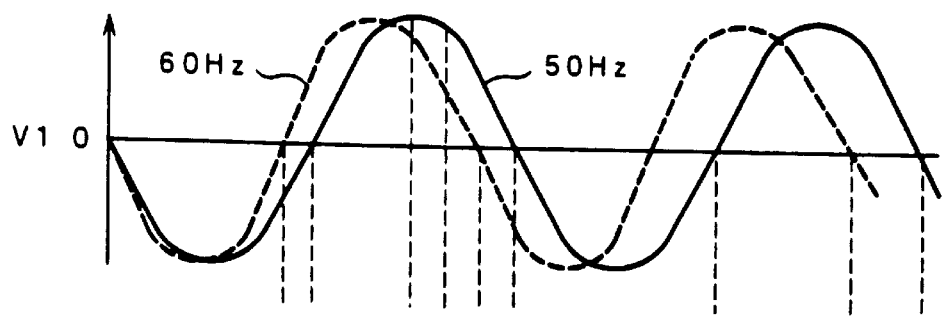
FIG. 2 shows at (a) to (c) wave forms at various points of the device of FIG. 1.

Referring, now, to FIG. 1, there is shown a circuit block diagram of a load control device as a first embodiment of this invention, in which an AC power supply 1 is connected with an AC motor 3 representing a load of the device through a thyrister 2 representing a switching element for a rotational speed control.

Between an anode and a cathode of the thyrister 2 there are connected in parallel a negative charging circuit 5 through a capacitor 4 to charge the capacitor 4 in a reverse direction with a negative voltage of the AC power supply 1 for each cycle and a positive charging circuit 6 through the capacitor 4 to charge the capacitor 4 in a positive direction with a positive voltage of the power supply 1.

The negative charging circuit 5 is composed of a series circuit of a resistor R1 and a diode D1. The positive charging circuit 6 is composed of a series circuit of a variable resistor R2 and a diode D2, and a PNP transistor Tr1 at its emitter and collector connected between the resistor R2 and the capacitor 4. A base of the transistor Tr1 is connected to a gate of the thyrister 2, and a resistor R3 is connected between the gate and the cathode of the thyrister 2.

Figure 2B:
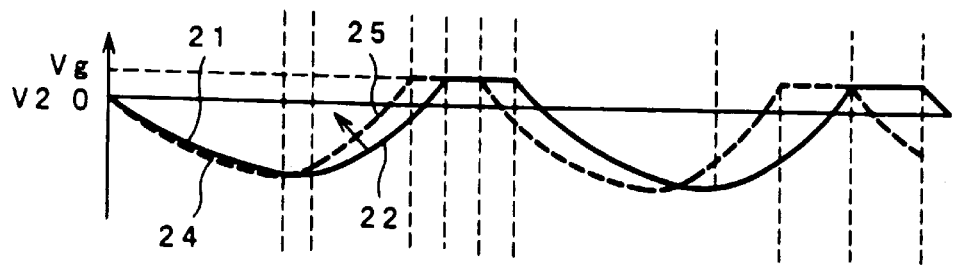
Figure 2C:
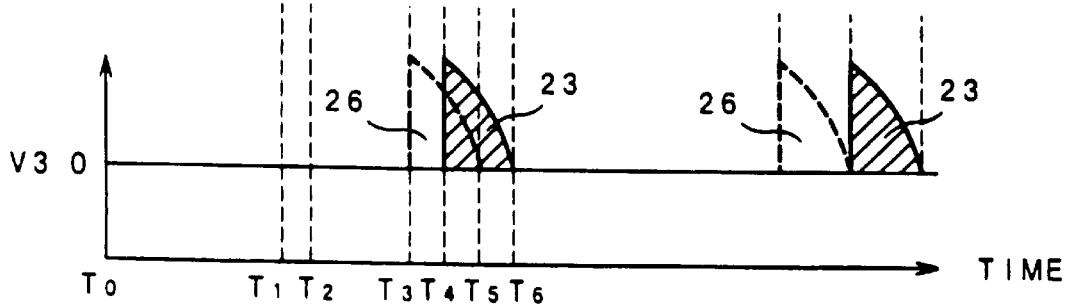

When the motor control device controls the motor 3 by employing a power line frequency 50 Hz in the AC power supply 1, a voltage wave form of the supply 1 is represented by a sinusoidal wave form shown by a solid line in FIG. 2 at (a). When a power supply voltage V1 is in a negative half cycle (between time points T0 and T2), the diode D1 of the negative charging circuit 5 conducts and a charging current "ia" flows in the flow path: AC power supply 1→capacitor 4→resistor R1→diode D1→AC motor 3→AC power supply 1.

The capacitor 4 is charged by the charging current "ia" in a negative direction as shown in a charging curve 21 depicted by a solid line in FIG. 2 at (b), but the AC motor 3 is not rotated by the charging current "ia".

When the power supply voltage V1 is in a positive half cycle (between time points T2 and T6), the diode D2 of the positive charging circuit 6 and the transistor Tr1 conduct and a charging current "ib", flows in the flow path: AC power supply 1→AC motor 3→diode D2→resistor R2→transistor Tr1→capacitor 4→AC power supply 1.

The capacitor 4 is charged by the charging current "ib", in a positive direction from the maximum charged voltage (time point T2) as shown in a charging curve 22 depicted by a solid line in FIG. 2 at (b), in which a base current flows through the resistor R3 from the transistor Tr1 but is too small to trigger the gate of the thyrister 2. The AC motor 3 is not rotated by the charging current "ib".

As a charged voltage V2 of the capacitor 4 rises in a positive direction in the positive half cycle and reaches a gate-trigger voltage Vg of the thyrister 2 (time point T4), the thyrister is turned on to supply the AC motor 3 with the positive half cycle voltage from the time point T4 until the time point T6. The AC motor 3 is supplied by a voltage V3 having a wave form 23 depicted by a solid line in FIG. 2 at (c), and rotated at a speed corresponding to the power of a conductive angle domain shown in the wave form 23.

As the variable resistor R2 of the positive charging circuit 6 is variably manipulated to decrease the resistance value, the time constant in the positive half cycle of the power supply voltage V1 is decreased so that the charging time of the capacitor 4 to reach the gate-trigger Vg of the thyrister 2 is shortened and the charging curve 22 rises in a arrow marked direction. As a result, the conductive angle of a current flowing through the thyrister 2 is increased. That is, the turning on point of the thyrister 2 moves from T4 to T2 so that the rotational speed of the motor 3 is increased according to the increase of the conductive angle domain.

As the variable resistor R2 is manipulated to increase its resistance value, the time constant in the positive half cycle of the power supply voltage V1 is increased so that the charging time of the capacitor 4 to reach the gate-trigger Vg of the thyrister 2 becomes long and the charging curve 22 declines downward in a direction reverse to the arrow mark. As a result, the conductive angle of a current flowing through the thyrister 2 is decreased. That is, the turning on point of the thyrister 2 moves from T4 toward T6 so that the rotational speed of the motor 3 is decreased according to the decrease of the conductive angle domain.

When the motor control device controls the motor 3 by employing a power line frequency 60 Hz, a voltage wave form of the supply 1 is represented by a sinusoidal wave form shown by a broken line in FIG. 2 at (a). When a power supply voltage V1 is in a negative half cycle (between time points T0 and T1), the diode D1 of the negative charging circuit 5 conducts and a charging current "ia" flows in the flow path: AC power supply 1→capacitor 4→resistor R1→diode D1→AC motor 3→AC power supply 1. The capacitor 4 is charged by the charging current "ia" in a negative direction as shown in a charging curve 24 depicted by a broken line in FIG. 2 at (b), but the AC motor 3 is not rotated by the charging current "ia". The negative charging time (negative half cycle) in 60 Hz is shorter and the negative maximum charged voltage is shallower in comparison with those in 50 Hz.

When the power supply voltage V1 is in a positive half cycle (between time points T1 and T5), the diode D2 of the positive charging circuit 6 and the transistor Tr1 conduct and a charging current "ib" flows in the flow path: AC power supply 1→AC motor 3→diode D2→resistor R2→transistor Tr1→capacitor 4→AC power supply 1. The capacitor 4 is charged by the charging current "ib" in a positive direction from the maximum charged voltage (time point T1) as shown in a charging curve 25 depicted by a broken line in FIG. 2 at (b), in which a base current flows through the resistor R3 from the transistor Tr1 but is too small to trigger the gate of the thyrister 2. The AC motor 3 is not rotated by the charging current "ib".

As a charged voltage V2 of the capacitor 4 rises in a positive direction in the positive half cycle and reaches a gate-trigger voltage Vg (time point T3), the thyrister 2 is turned on to supply the AC motor 3 with the positive half cycle voltage from the time point T3 until the time point T5 when the positive half cycle ends. The time to reach the gate-trigger voltage Vg is short because the negative maximum voltage is shallow.

The AC motor 3 is supplied by a voltage V3 having a wave form 26 depicted by a broken line in FIG. 2 at (c), and rotated at a speed corresponding to the power of a conductive angle domain shown in the wave form 26.

As the variable resistor R2 of the positive charging circuit 6 is variably manipulated to decrease the resistance value, the time constant in the positive half cycle of the power supply voltage V1 is decreased so that the charging time of the capacitor 4 to reach the gate-trigger Vg of the thyrister 2 is shortened and the charging curve 25 rises in a arrow marked direction. As a result, the conductive angle of a current flowing through the thyrister 2 is increased. That is, the turning on point of the thyrister 2 moves from T3 to T1 so that the rotational speed of the motor 3 is increased according to the increase of the conductive angle domain.

As the variable resistor R2 is manipulated to increase its resistance value, the time constant in the positive half cycle of the power supply voltage V1 is increased so that the charging time of the capacitor 4 to reach the gate-trigger Vg of the thyrister 2 becomes long and the charging curve 25 declines downward in a direction reverse to the arrow mark. As a result, the conductive angle of the current flowing through the thyrister 2 is decreased. That is, the turning on point of the thyrister 2 moves from T3 toward T5 so that the rotational speed of the motor 3 is decreased according to the decrease of the conductive angle domain.

As described above, the conductive angle of the thyrister 2 can be corrected corresponding to the variations of the power line or supply frequencies by applying the negative and positive charging circuit 5 and 6 to a phase control circuit of the thyrister 2. Thus, the conductive angle of the thyrister 2 remains nearly equal in the power supply frequencies 50 Hz and 60 Hz.

Figure 3:
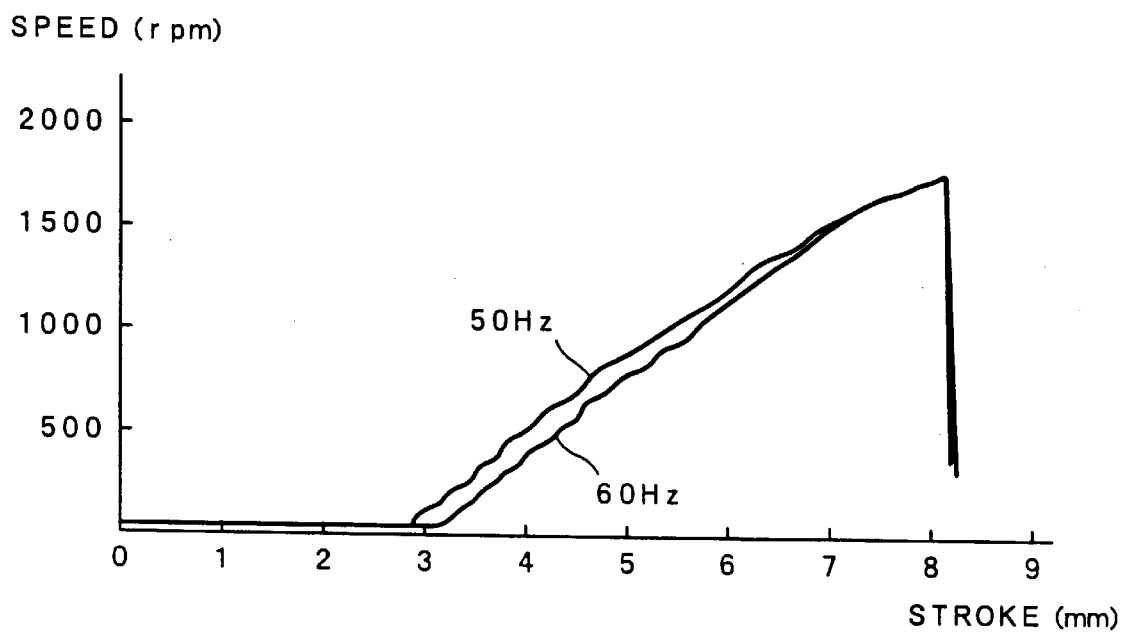
FIG. 3 shows the relation between a stroke and a rotational speed of an electric motor controlled by the control device.

When the motor control device of this embodiment is applied to a motor control circuit of a power tool for screwing bolts or the like and the resistance value of the variable resistor R2 is varied in a link motion with a stroke manipulation of a switch employed in the power tool to control the rotational speed of a motor, the relation between the switch stroke and the rotational speed of the motor in the power supply frequencies 50 Hz and 60 Hz is shown in FIG. 3, wherein the variable speed domains in 50 Hz and 60 Hz are almost same. Accordingly, the stroke manipulation of the switch is not necessary to be changed in accordance with the power supply frequencies, and the operability of the power tool is improved.

Figure 4:
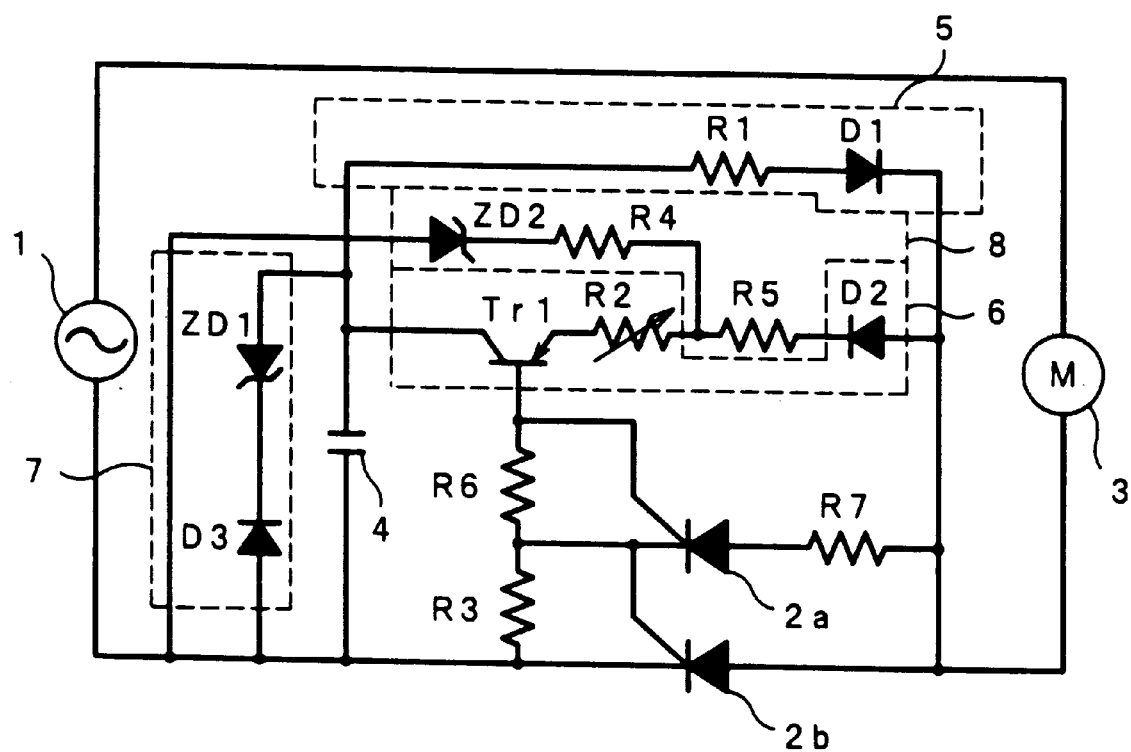
FIG. 4 is a circuit block diagram of a load control device as a second embodiment of this invention.
Figure 5A:
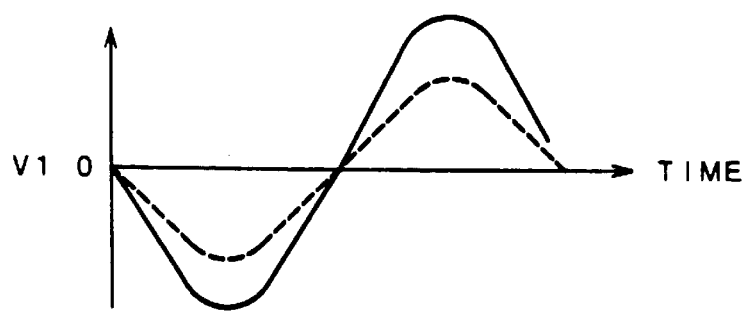
FIG. 5 shows at (a) to (e) wave forms at various points of the device of FIG. 4.
Figure 5B:
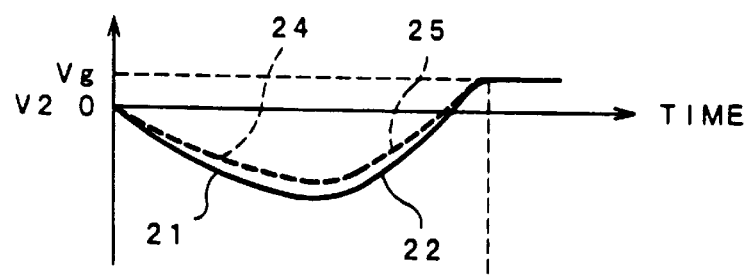
Figure 5C:
Figure 5D:
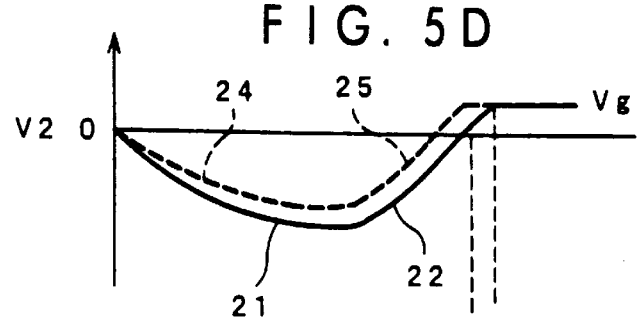
Figure 5E:
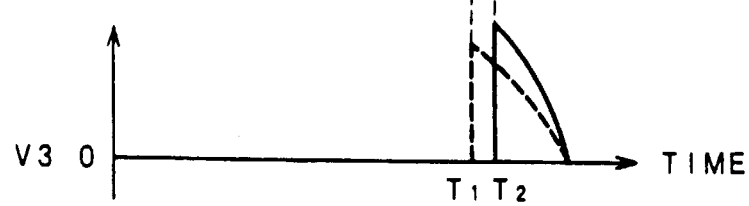

FIG. 4 is a circuit block diagram of a load control device as a second embodiment of this invention, in which a motor 3 is a load of the device. The components corresponding to those of FIG. 1 are given by the same reference symbols, and the explanation about their construction and operations except different components will be omitted.

In this embodiment, a limiter circuit 7 is connected in parallel across capacitor 4, a positive charging circuit 6 includes a constant voltage circuit 8, a switching element including an auxiliary thyrister 2a and a main thyrister 2b which is turned on by an ON operation of the auxiliary thyrister 2a is connected to a power supply circuit of the motor 3.

The limiter circuit 7 includes a Zener diode ZD1 having poles reverse to a voltage in a negative half cycle and a diode D3 reversely connected in series with the Zener diode ZD1 to limit a voltage charged in the capacitor 4 in a reverse direction by a negative half cycle voltage so that the charged voltage does not exceed a withstanding voltage of the capacitor 4. The diode D3 prevents the Zener diode ZD1 from conducting in a forward direction when the capacitor 4 is charged in a forward direction.

The constant voltage circuit 8 includes a resistor R5 connected between a variable resistor R2 and a diode D2 of the positive charging circuit 6 and a Zener diode ZD2 connected between a connection point of the resistor R5 and the variable resistor R2 and a negative side of the power supply 1 through a resistor R4 to keep the voltage constant which charges the capacitor 4 in a positive direction when the voltage of the AC power supply 1 drops.

A series circuit of resistors R3 and R6 is connected between a base of a transistor Tr1 and the negative side of the AC power supply 1, the cathode and gate of the main thyrister 2b are connected across the resistor R3, and the cathode and gate of the auxiliary thyrister 2a are connected across the resistor R6.

As the resistance value of the variable resistor R2 is increased, a rising slant of a charged voltage V2 charged in the capacitor 4 in a positive direction by a positive half cycle voltage become gentle to decrease a conductive angle of the major thyrister 2b including the auxiliary thyrister 2a, wherein even if the conductive angle becomes zero, the terminal voltage V2 of the capacitor 4 does not return to the positive and increases in a negative direction as the resistance value of the resistor R2 increases.

As the terminal voltage of the capacitor 4 in the negative direction becomes larger than the Zener voltage of the Zener diode ZD1, the Zener diode ZD1 conducts to discharge the charged voltage of the capacitor 4 in the negative direction through the diode D3 and the Zener diode ZD1. Accordingly, the capacitor 4 is prevented from any storage of the negative voltage over its withstanding voltage, whereby the capacitor 4 is protected from destruction and can be reduced about its capacity because the capacitor 4 is not necessary to have any over-capacity.

Unless the positive charging circuit 6 is provided with the constant voltage circuit 8, as the power supply voltage V1 of the power supply 1 drops from a solid line curve to a broken line curve of FIG. 5 at (a), the slant of a charging curve 24 of the capacitor 4 in a negative direction becomes gentle and the slant of a charging curve 25 in a positive direction also becomes gentle, while the charged voltage V2 in the positive direction reaches the gate-trigger voltage Vg of the thyrister at the same time point T2 as shown in FIG. 5 at (b).

However, as the thyrister turns on at the time point T2 when the power supply voltage V1 is high as shown in the solid line, a voltage V3 supplied to the AC motor 3 has a conductive domain shown in a solid line of FIG. 5 (c). When the supply voltage V1 is low, the voltage V3 has a conductive domain shown in a broken line of FIG. 5(c), and the rotational speed of the AC motor 3 becomes slower than the speed when the power supply voltage is high.

If the positive charging circuit 6 is provided with the constant voltage circuit 8, the capacitor 4 is charged in a positive direction by a constant current defined by the Zener diode ZD2 and the resistors R4 and R5 when the power supply voltage drops.

Accordingly, as shown in FIG. 5 at (d), the slant of the charging curve 25 of the capacitor 4 in a positive direction when the supply voltage is low has the same slant of the charging curve 22 of the capacitor 4 in a positive direction when the supply voltage is high, while the time point T1 when the charged voltage V2 in the positive direction at the low power supply voltage reaches the gate-trigger voltage Vg of the thyristor is earlier than the time point T2. Accordingly, a conductive domain depicted in a broken line of FIG. 5 at (e) when the power supply voltage is low is almost same as a conductive domain depicted in a solid line of FIG. 5 at (e) when the power supply voltage is high. As a result, the rotational speed of the motor 3 may be prevented from reduction when the power supply voltage varies to a lower direction.

In this second embodiment there is employed a two step construction of the main thyristor 2b switching the power circuit of the AC motor 3 and the auxiliary thyristor 2a turning on the main thyristor 2b, so that the gate current of the thyrister can be designed to be small and the current consumed by the variable resistor R2 and the transistor Tr1 can be small, reducing heat generated thereby.

Figure 6:
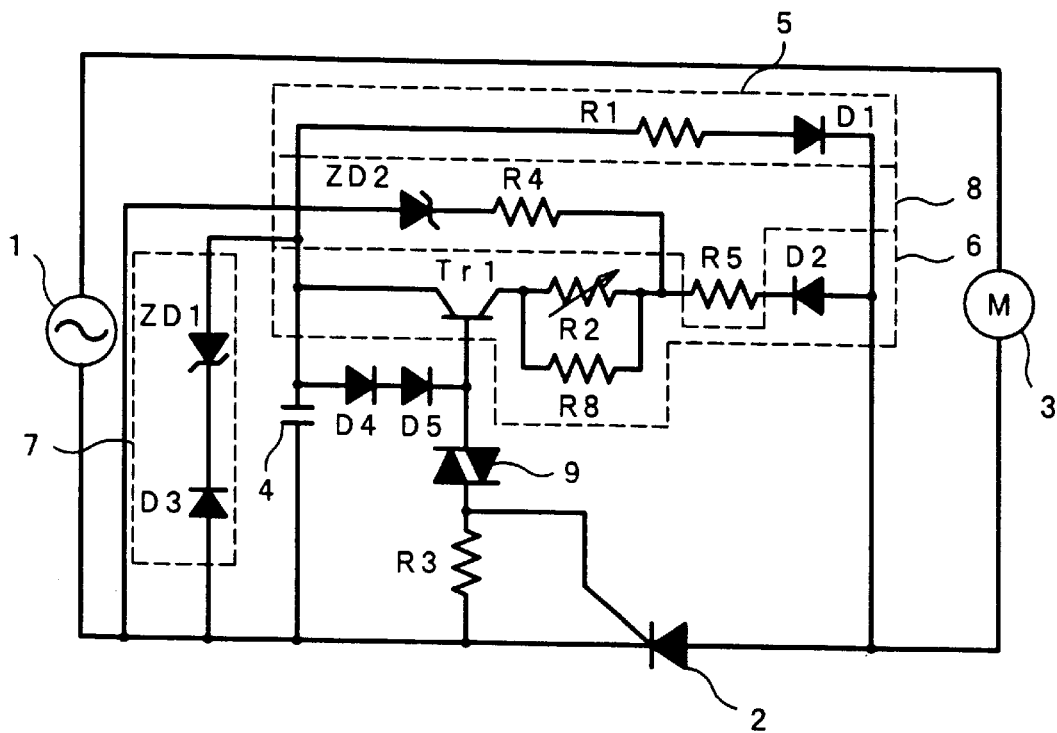
FIG. 6 is a circuit block diagram of a load control device as a third embodiment of this invention.

Referring to FIG. 6, there is shown a circuit block diagram of a motor control device as a third embodiment of this invention. The components corresponding to those of FIGS. 1 and 4 are represented by the same reference symbols, and the explanation about their construction and operations except different components will be omitted.

As shown in FIG. 6, this third embodiment is characterized in that a gate trigger element 9 for a thyristor 2 employs DIAC and is connected between a gate of the thyrister 2 and a base of a transistor Tr1 providing a positive charging circuit 6, a pair of diodes D4 and D5 are connected in series between a positive terminal of a capacitor 4 and a connection of the base of the transistor Tr1 and the gate trigger element 9, and a resistor R8 is connected in parallel with a variable resistor R2 in the positive charging circuit 6 to provide a logarithmically changing resistance combined by both resistors for providing the rotational speed of a motor with downwardly curved characteristics.

Figure 7:
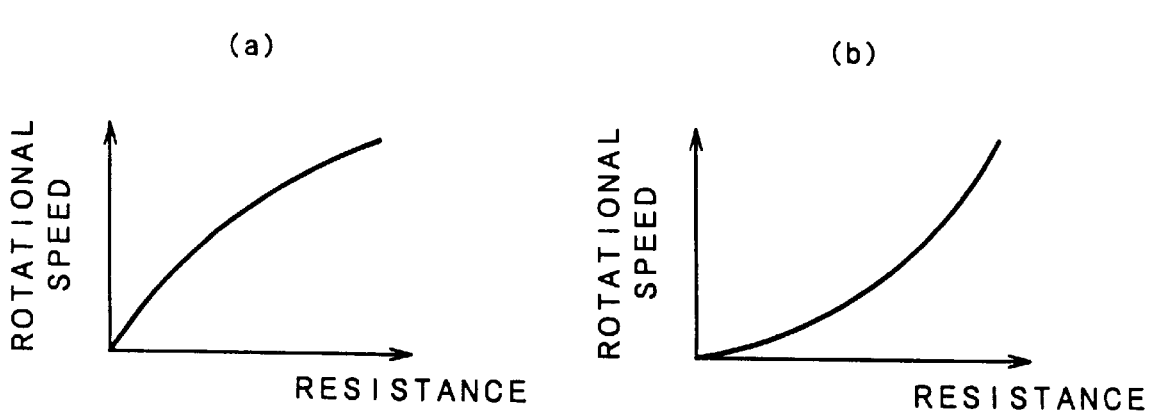
FIG. 7 shows at (a) and (b) the relation between a variable resistance and a rotational speed of an electric motor controlled by the control device of FIG. 6.

If a control resistance in the positive charging circuit 6 employs only the variable resistor R2 and the resistance value of the resistor R2 linearly varies, the conductive angle of the thyristor 2 linearly varies but the rotational speed of an AC motor 3 versus the resistance change of the variable resistor R2 has upwardly curved characteristics as shown in FIG. 7 at (a) because the power supply applied to the motor 3 is an AC power supply. Accordingly, the ratio of speed change is large when the motor 3 starts, and undesirable for application to a power tool used for screwing bolts.

This third embodiment, however, has the construction that the variable resistor R2 is connected in parallel with the resistor R8 and the combined resistance with the resistor R8 logarithmically changes as the resistance value of the resistor R2 linearly changes, so that the rotational speed of the AC motor 3 has downwardly curved characteristics as shown in FIG. 7 at (b). Thus, when the motor 3 starts, the ratio of speed change is small and the rotational speed gently increases which is suitable for a power tool to screw a bolt with fixing it in a position.

Since the DIAC is employed for the gate trigger element 9 to trigger the thyrister 2 in this embodiment, the gate trigger element 9 conducts and its negative resistance allows a pulse current to flow in the gate of the thyrister 2 for turning on the thyrister when the charged voltage of the capacitor 4 in a positive direction reaches a breakover voltage of the gate trigger element 9. Thus, a current consumed by the resistor R5, the variable resistor R2 and the transistor Tr1 in the positive charging circuit is reduced and heat generated thereby also is reduced, retaining a peak gate current of the thyrister.

Figure 8:
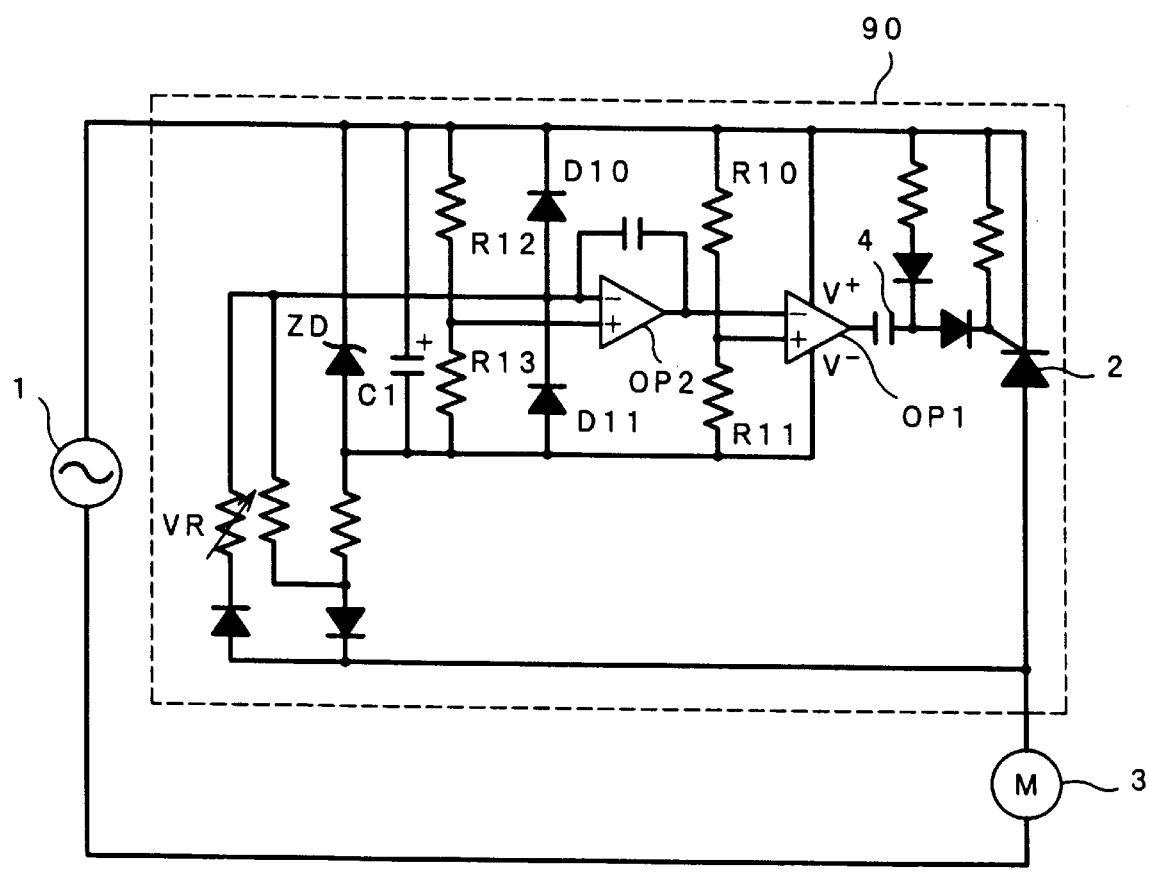
FIG. 8 is a circuit block diagram of a load control device as a fourth embodiment of this invention.

In FIG. 8 is a circuit block diagram of a motor load control device as a fourth embodiment of this invention. The components corresponding to those of FIG. 1 are represented by the same reference symbols. In FIG. 8, a phase control unit 90 is disposed to control a phase of a thyristor 2 served as a speed control switching element for an AC motor 3, and provided with operational amplifiers OP1 and OP2. The operational amplifiers and their associated components including resistors R10 to R13, a Zener diode ZD, a capacitor C1, diodes D10 and D11 or the like provide the negative and positive charging circuits shown in FIG. 1. In this embodiment, the components of the phase control unit, except the thyristor 1, the capacitor 4 and a variable resistor VR, may be constructed into an integrated circuit.

If the thyristors 2, 2a and 2b are connected with the power supply on opposite polarity in FIGS. 1, 4 and 6, the diodes D1 to D5, and the Zener diodes ZD1 and ZD2 in the drawings should be connected on opposite polarity respectively, and the transistor Tr1 should employ a NPN transistor. If desired, the switching elements in the foregoing embodiments may employ semiconductor elements such as MOS transistors other than the thyristors.

It will be understood that the same reference numbers or symbols as those of foregoing embodiments are given to several components of the embodiments described hereinafter which do not correspond to the components of the foregoing embodiments.

Figure 9:
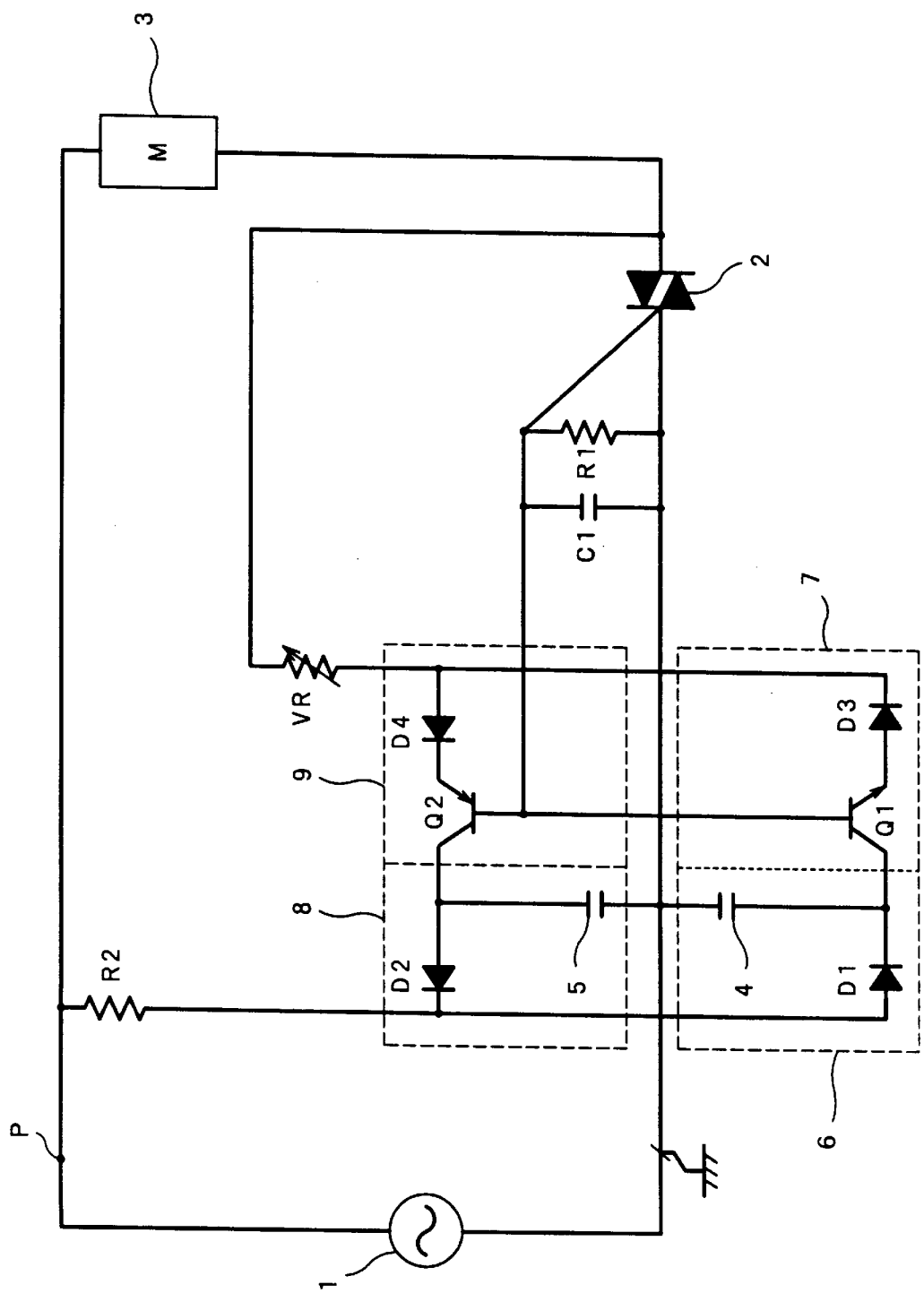
FIG. 9 is a circuit block diagram of a motor control device as a fifth embodiment of this invention.
Figure 10A:
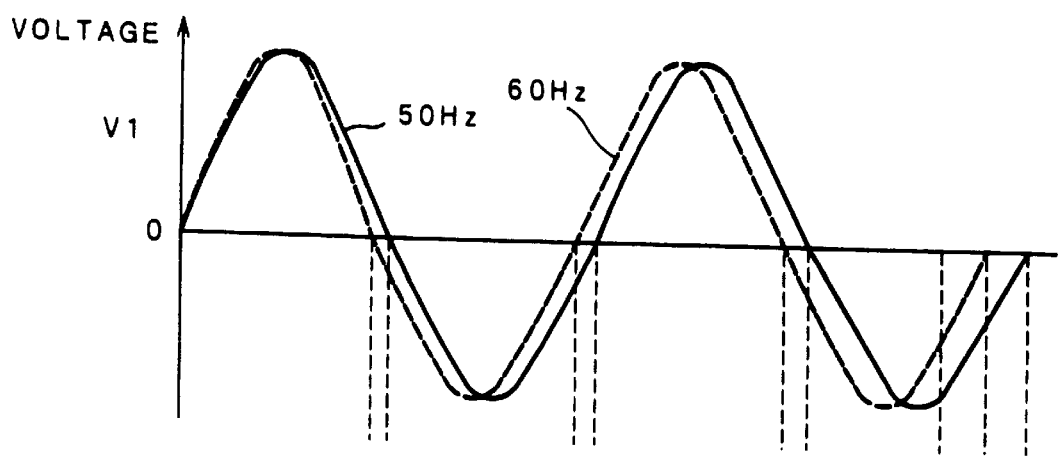
FIG. 10 shows at (a) to (e) wave forms at various points of the motor control device of FIG. 9.
Figure 10B:
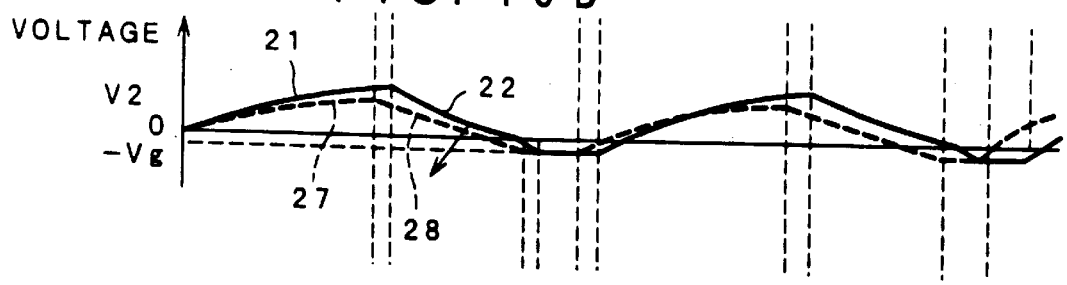
Figure 10C:
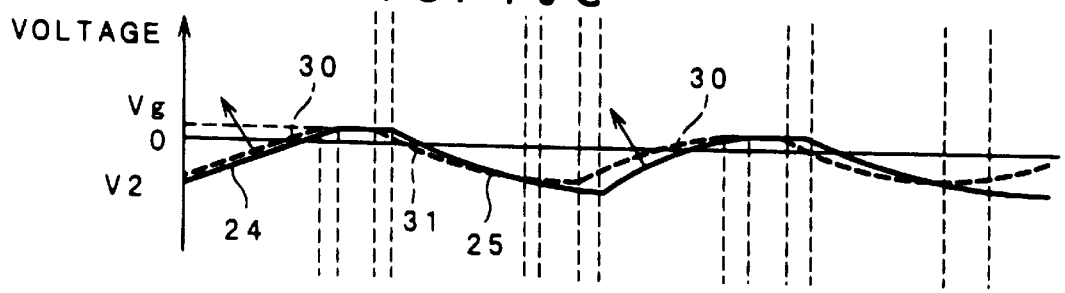
Figure 10D:
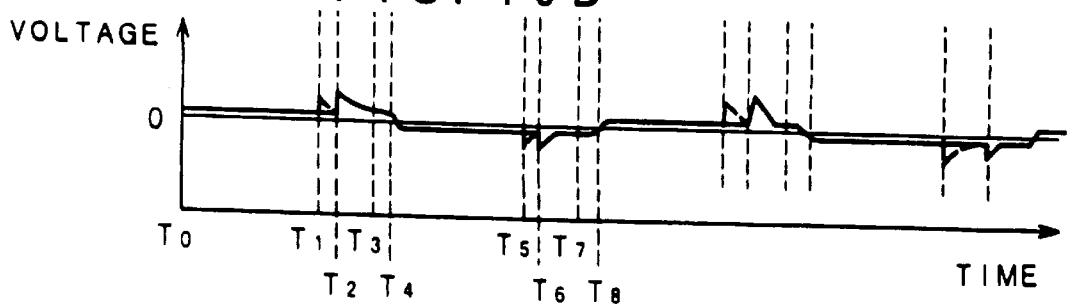
Figure 10E:
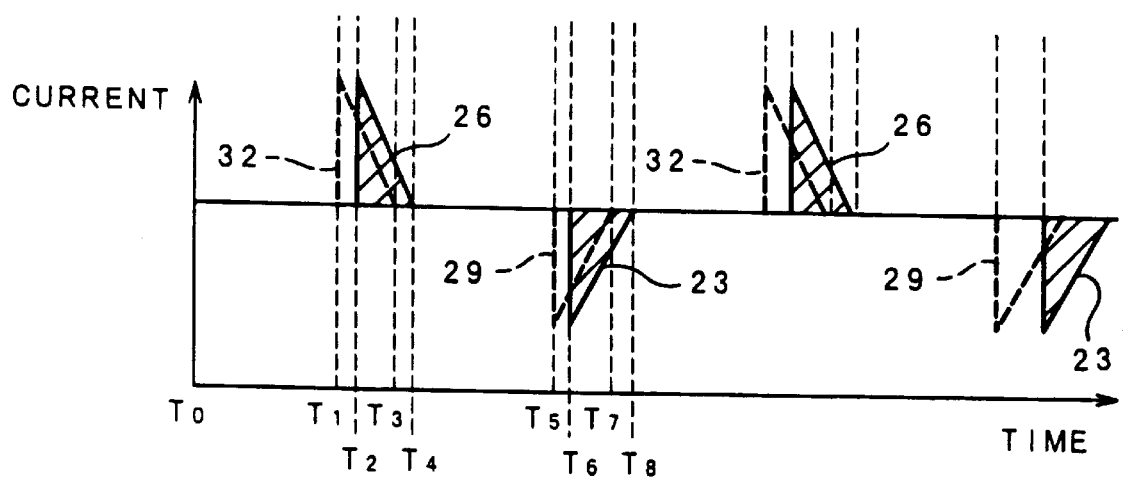

FIG. 9 is a circuit block diagram of a motor control device as a fifth embodiment of this invention, which includes an AC power supply 1, a bidirectional switching element (TRIACk) 2 for a speed control, an AC motor 3, first and second capacitors 4 and 5 for reserving a charged voltage to trigger the bidirectional switching element 2 in the negative and positive half cycles of the power supply 1, a full-wave phase control circuit composed of a first positive charging circuit 6, a first negative charging circuit 7, a second negative charging circuit 8, and a second positive charging circuit 9.

The AC power supply 1 is connected with the AC motor 3 through the bidirectional switching element 2. The first capacitor 4 is connected across the power supply 1 through a diode D1 and a resistor R2. The first capacitor 4, the diode D1 and the resistor R2 provides the first positive circuit 6 which charges the first capacitor in a positive half cycle of the power supply 1 in a positive direction for each cycle.

The first negative charging circuit 7 including a series circuit composed of a NPN transistor Q1, a diode D3 and a variable resistor VR charges the first capacitor 4 in a negative (reverse) direction in a negative half cycle of the power supply 1 from the end of charging in the positive half cycle by the first positive charging circuit 6, and triggers the bidirectional switching element 2 when the charged voltage reaches the gate trigger voltage of the element 2. The first negative charging circuit 7 is connected between a connection of the first capacitor 4 and the diode D1 in the first positive charging circuit 6 and an anode of the switching element 2.

The second capacity 5 is connected across the AC power supply 1 through a diode D2 and the resistor R2. The second capacitor 5, the diode D2 and the resistor R2 provides the second negative circuit 8 which charges the second capacitor 5 in a negative half cycle of the power supply 1 in a negative direction for each cycle.

The second positive charging circuit 9 including a series circuit composed of a PNP transistor Q2, a diode D4 and a variable resistor VR charges the second capacitor 5 in a positive (reverse) direction in a positive half cycle of the power supply 1 from the end of charging in the negative half cycle by the second negative charging circuit 8, and triggers the bidirectional switching element 2 when the charged voltage reaches the gate trigger voltage of the element 2. The second positive charging circuit 9 is connected between a connection of the second capacitor 5 and the diode D2 in the second negative charging circuit 8 and an anode of the switching element 2.

The gate of the bidirectional switching element 2 is connected with bases of the transistors Q1 and Q2. Protection capacitor C1 and resistor R1 are connected in parallel between the gate and the anode of the bidirectional switching element 2.

When thus constructed motor control device controls the motor 3 by employing a power line frequency 50 Hz in the AC power supply 1, a voltage wave form of the supply 1 is represented by a sinusoidal wave form shown by a solid line in FIG. 10 at (a). When an AC power supply voltage V1 at a point P of FIG. 9 is in a positive half cycle (between time points T0 and T4 in FIG. 10), the diode D1 of the first positive charging circuit 6 conducts and a charging current flows in the flow path: AC power supply 1→resistor R2→diode D1→capacitor 4→AC power supply 1. The capacitor 4 is charged by this charging current in a positive direction as shown in a charging curve 21 depicted by a solid line in FIG. 10 at (b).

When the power supply voltage V1 at the point P of FIG. 9 is in a negative half cycle (between time points T4 and T8 of FIG. 10), the diode D3 and the transistor Q1 of the first negative charging circuit 7 conduct and a charging current flows in the flow path: AC power supply 1→capacitor 4→transistor Q1→diode D3→variable resistor VR→AC motor 3→AC power supply 1. The first capacitor 4 is reversely charged by the charging current in a negative direction from the maximum charged voltage as shown in a charging curve 22 depicted by a solid line in FIG. 10 at (b), in which a base current flows through the transistor Q1 but is too small to trigger the gate of the bidirectional switching element 2. The AC motor 3 is not rotated by the charging current.

As the first capacitor 4 is charged in a reverse direction by the negative half cycle voltage and the charged voltage V2 gradually decreases according to a time constant defined by the resistance value of the variable resistor VR to enter into a negative domain and to reach the gate trigger voltage −Vg of the bidirectional switching element 2 (time point T6), the switching element 2 is turned on by the application of a negative trigger voltage shown in a solid line of FIG. 10 at (d) to the gate of the switching element 2. Accordingly, from the time point T6 until the time point T8 where the negative half cycle is finished, the AC motor 3 is supplied by a current of a wave form 23 depicted by a solid line in FIG. 10 at (e).

When an AC power supply voltage V1 at a point P of FIG. 9 is in a positive half cycle (between time points T0 and T4 in FIG. 10), the diode D4 and the transistor Q2 of the second negative charging circuit 9 conducts and a charging current flows in the flow path: AC power supply 1→AC motor 3→variable resistor VR→transistor Q2→AC power supply 1. The second capacitor 5 is charged in a positive direction by this charging current as shown in a charging curve 24 depicted by a solid line in FIG. 10 at (c). Then, a base current flows in the transistor Q2, but is too small to trigger the gate of the bidirectional switching element 2. The AC motor 3 also is not rotated by the charging current.

As the second capacitor 5 is charged in a forward direction by the positive half cycle voltage and the charged voltage V2 gradually increases according to a time constant defined by the resistance value of the variable resistor VR to enter into a positive domain and to reach the gate trigger voltage Vg of the bidirectional switching element 2 (time point T2), the switching element 2 is turned on by the application of a positive trigger voltage shown in a solid line of FIG. 10 at (d) to the gate of the switching element 2. Accordingly, from the time point T2 until the time point T4 where the positive half cycle is finished, the AC motor 3 is supplied by a current of a wave form 26 depicted by a solid line in FIG. 10 at (e). Thus, the AC motor 3 is rotated at a speed corresponding to the power in conductive angle domains of both wave forms 26 and 23.

When an AC power supply voltage V1 at a point P of FIG. 9 is in a negative half cycle (between time points T4 and T8 in FIG. 10), the diode D2 of the second negative charging circuit 8 conducts and a charging current flows in the flow path: AC power supply 1→capacitor 4→diode D1→resistor R1→AC power supply 1. The second capacitor 5 is reversely charged by this charging current in a negative direction as shown in a charging curve 25 depicted by a solid line in FIG. 10 at (c). When it is in a positive half cycle, the second positive charging circuit 9 operates in the same manner as those described above.

When the resistance of the variable resistor VR is reduced by a variable manipulation in the first negative charging circuit 7 and the second positive charging circuit 9, the time constant in a positive or negative half cycle becomes small so that a charging time in the second capacitor 5 or the first capacitor 4 to reach the gate trigger voltage Vg or −Vg becomes short and the charging curve 24 or 22 rises in an arrow marked direction. As a result, the conductive angle of a current in the bidirectional switching element is increased to increase the rotational speed.

When the resistance of the variable resistor VR is increased by a variable manipulation, the time constant in a positive or negative half cycle of the power supply voltage V1 becomes large so that a charging time in the second capacitor 5 or the first capacitor 4 to reach the gate trigger voltage Vg or −Vg becomes long and the charging curve 24 or 22 is shifted in a direction reverse to the arrow marked direction. As a result, the conductive angle of a current in the bidirectional switching element is decreased to reduce the rotational speed.

Next, when thus constructed motor control device controls the motor 3 by employing a power line frequency 60 Hz in the AC power supply 1, a voltage wave form of the supply 1 is represented by a sinusoidal wave form shown by a broken line in FIG. 10 at (a). When an AC power supply voltage V1 at a point P of FIG. 9 is in a positive half cycle (between time points T0 and T3 in FIG. 10), the diode D1 of the first positive charging circuit 6 conducts and a charging current flows in the flow path: AC power supply 1→resistor R2→diode D1→capacitor 4→AC power supply 1. The capacitor 4 is charged by this charging current in a positive direction as shown in a charging curve 27 depicted by a broken line in FIG. 10 at (b).

When the power supply voltage V1 at the point P of FIG. 9 is in a negative half cycle (between time points T3 and T7 of FIG. 10), the diode D3 and the transistor Q1 of the first negative charging circuit 7 conduct and a charging current flows in the flow path: AC power supply 1→capacitor 4→transistor Q1→diode D3→variable resistor VR→AC motor 3→AC power supply 1. The first capacitor 4 is reversely charged by the charging current in a negative direction from the maximum charged voltage as shown in a charging curve 28 depicted by a broken line in FIG. 10 at (b), in which a base current flows through the transistor Q1 but is too small to trigger the gate of the bidirectional switching element 2. The AC motor 3 is not rotated by the charging current.

As the first capacitor 4 is charged in a reverse direction by the negative half cycle voltage and the charged voltage V2 gradually decreases according to the time constant defined by the resistance value of the variable resistor VR to enter into the negative domain and to reach the gate trigger voltage −Vg of the bidirectional switching element 2 (time point T5), the switching element 2 is turned on by the application of a negative trigger voltage shown in a broken line of FIG. 10 at (d) to the gate of the switching element 2. Accordingly, from the time point T5 until the time point T7 where the negative half cycle is finished, the AC motor 3 is supplied by a current of a wave form 29 depicted by a broken line in FIG. 10 at (e).

When an AC power supply voltage V1 at a point P of FIG. 9 is in a positive half cycle (between time points T0 and T3 in FIG. 10), the diode D4 and the transistor Q2 of the second negative charging circuit 9 conducts and a charging current flows in the flow path: AC power supply 1→AC motor 3→variable resistor VR→transistor Q2→AC power supply 1. The second capacitor 5 is charged in a positive direction by this charging current as shown in a charging curve 30 depicted by a broken line in FIG. 10 at (c). Then, a base current flows in the transistor Q2, but is too small to trigger the gate of the bidirectional switching element 2. The AC motor 3 also is not rotated by the charging current.

As the second capacitor 5 is charged in a forward direction by the positive half cycle voltage and the charged voltage V2 gradually increases according to a time constant defined by the resistance value of the variable resistor VR to enter into a positive domain and to reach the gate trigger voltage Vg of the bidirectional switching element 2 (time point T1), the switching element 2 is turned on by the application of a positive trigger voltage shown in a broken line of FIG. 10 at (d) to the gate of the switching element 2. Accordingly, from the time point T1 until the time point T3 where the positive half cycle is finished, the AC motor 3 is supplied by a current of a wave form 32 depicted by a broken line in FIG. 10 at (e). Thus, the AC motor 3 is rotated at a speed corresponding to the power in conductive angle domains of both wave forms 32 and 29.

When an AC power supply voltage V1 at a point P of FIG. 9 is in a negative half cycle (between time points T3 and T7 in FIG. 10), the diode D2 of the second negative charging circuit 8 conducts and a charging current flows in the flow path: AC power supply 1→capacitor 4→diode D1→resistor R1→AC power supply 1. The second capacitor 5 is reversely charged by this charging current in a negative direction as shown in a charging curve 31 depicted by a broken line in FIG. 10 at (c). When it is in a positive half cycle, the second positive charging circuit 9 operates in the same manner as those described above.

When the resistance of the variable resistor VR is reduced by a variable manipulation in the first negative charging circuit 7 and the second positive charging circuit 9, the time constant in a positive or negative half cycle becomes small so that a charging time in the second capacitor 5 or the first capacitor 4 to reach the gate trigger voltage Vg or −Vg becomes short and the charging curve 30 or 28 rises in an arrow marked direction. As a result, the conductive angle of a current in the bidirectional switching element is increased to increase the rotational speed.

When the resistance of the variable resistor VR is increased by a variable manipulation, the time constant in a positive or negative half cycle becomes large so that a charging time in the second capacitor 5 or the first capacitor 4 to reach the gate trigger voltage Vg or −Vg becomes long and the charging curve 30 or 28 is shifted in a direction reverse to the arrow marked direction. As a result, the conductive angle of a current in the bidirectional switching element 2 is decreased to reduce the rotational speed of the AC motor 3.

Thus, the conductive angle of the bidirectional switching element 2 can be corrected in accordance with variations of the power supply frequency by incorporating the first positive charging circuit 6, the first negative charging circuit 7, the second negative charging circuit 8 and the second positive circuit 9 into the full-wave phase control circuit of the switching element 2. That is, the conductive angle of the bidirectional switching element 2 is little changed even if the power supply frequency is 50 Hz or 60 Hz.

Figure 11:
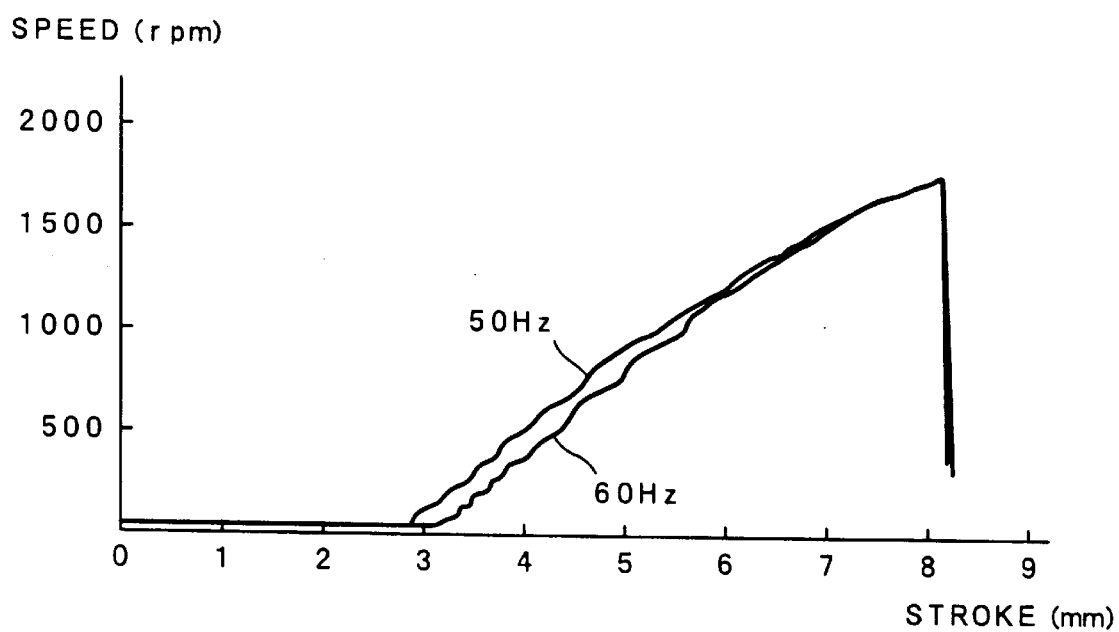
FIG. 11 shows the relation between a stroke and a rotational speed of an electric motor controlled by the motor control device of FIG. 9.

When the motor control device of this embodiment is applied to a motor control circuit of a power tool for screwing volts, a resistance of a variable volume VR is changed in a link motion with a stroke manipulation of a switch of the power tool to control a rotational speed of a motor of the tool, the relation between the switch stroke and the rotational speed of the motor in the power supply frequencies 50 Hz and 60 Hz is shown in FIG. 11. As shown i FIG. 11, the variable speed domains in the power supply frequencies 50 Hz and 60 Hz are almost same, so that the stroke manipulation is little necessary to be changed in accordance with the power supply frequencies, improving operations of the power tool.

Figure 12:
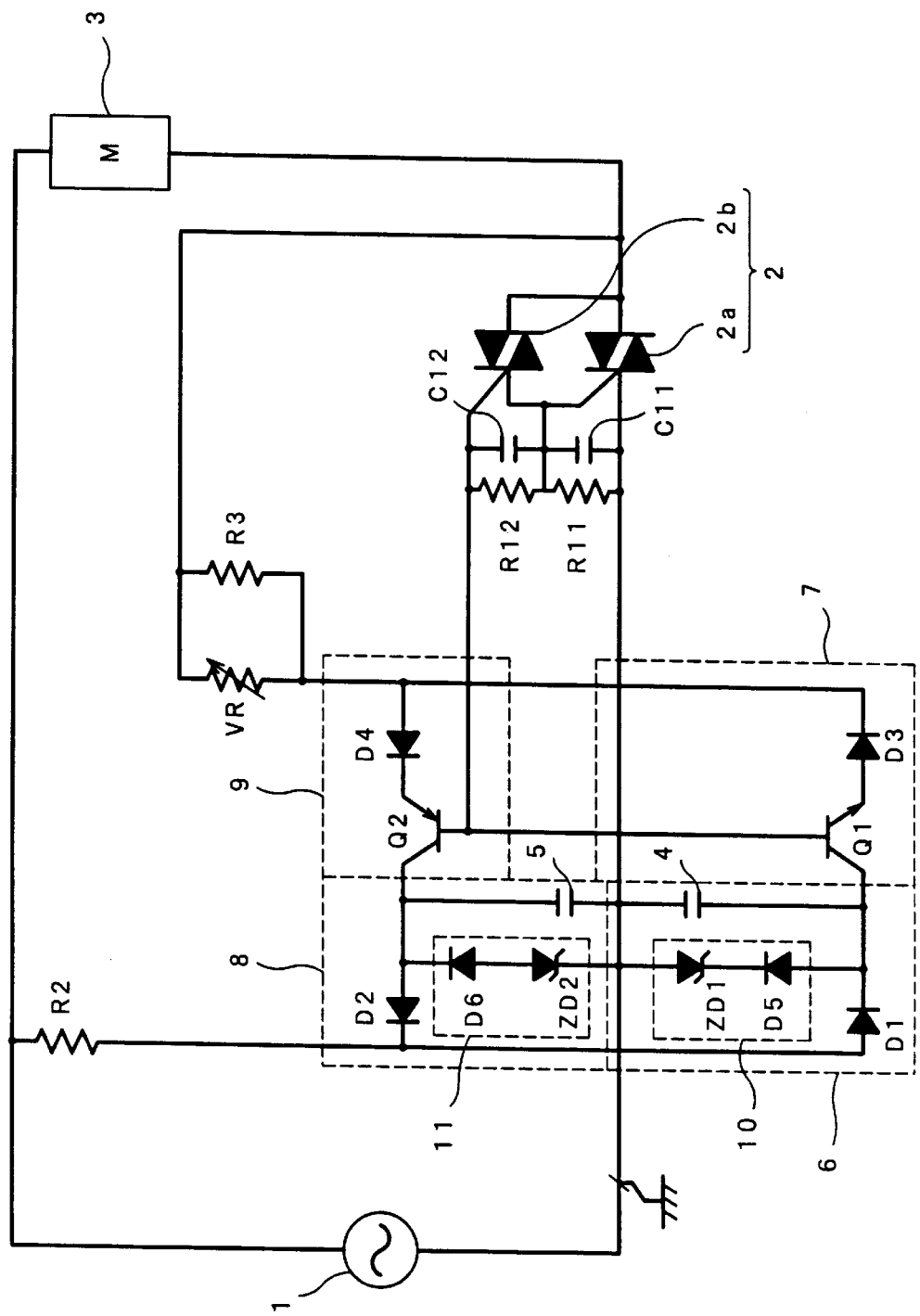
FIG. 12 is a circuit block diagram of a motor control device as a sixth embodiment of this invention.

FIG. 12 is a circuit block diagram of a motor control device as a sixth embodiment of this invention, the components corresponding to those of FIG. 9 are given by the same reference symbols, and the explanation about their construction and operations except different components will be omitted.

As shown in FIG. 12, this sixth embodiment is characterized in that a first limiter circuit 10 is connected in parallel with a first capacitor 4 in a first positive charging circuit 6, a second limiter circuit 11 is connected in parallel with a second capacitor 5 in a second negative charging circuit 8, a bidirectional switching element 2 is composed of an auxiliary bidirectional switching element 2b turned on by a small gate current and a main bidirectional switching element 2a turned on by an on-operation of the auxiliary bidirectional switching element 2b, a variable resistor VR of the first negative charging circuit 7 and the second positive charging circuit 9 is connected in parallel with a resistor R3 so that their combined resistance is logarithmically changed to provide an AC motor 3 with downwardly curved speed characteristics.

The main bidirectional switching element 2a is interposed between the motor 3 and a power supply 1, and the auxiliary bidirectional switching element 2b is connected between an gate and one end terminal of the main bidirectional switching element 2a. A capacitor C11 and a resistor R11 are connected in parallel between another end terminal and the gate of the main element 2a, a capacitor C12 and a resistor R12 are connected in parallel between the gate of the element 2a and a gate of the auxiliary element 2b.

The first limiter circuit 10 is composed of a Zener diode ZD1 reversely connected against a positive half cycle voltage and a diode D5 connected reversely to and in series with the Zener diode ZD1, and designed to limit a voltage charged in a plus polarity by a positive half cycle voltage for each cycle in the capacitor 4 below a withstanding voltage thereof. The diode D5 prevents the Zener diode ZD1 from forwardly conducting when the first capacitor 4 is charged in a negative direction.

A second limiter circuit 11 is composed of a Zener diode ZD2 connected reversely against a negative half cycle voltage and a diode D6 connected reversely and in series with the Zener diode ZD2, and limits a voltage charged in a second capacitor 5 by a negative half cycle voltage in a minus polarity for each cycle below a withstanding of the capacitor 5. The diode D6 prevents the Zener diode ZD2 from conducting forwardly when the second capacitor 5 is charged in a positive direction.

As a resistance of the variable resistor VR in the first negative charging circuit 7 is increased, a declining slope of a voltage V2 charged in the first capacitor 4 by a negative half cycle voltage in a negative direction becomes gentle and a conductive angle of the main bidirectional switching element 2a including the auxiliary bidirectional switching element 2b becomes small. As the conductive angle becomes zero and the resistance of the variable resistor VR is further increased, the terminal voltage V2 of the first capacitor 4 does not reach any negative voltage but increases in a positive direction.

When the terminal voltage in a positive direction of the first capacitor 4 becomes larger than the Zener voltage of the Zener diode ZD1, the Zener diode ZD1 conducts and the voltage charged in the capacitor 4 in the positive direction is discharged through the diode D5 and the Zener diode ZD1. As a result, the first capacitor 4 is free from being charged with a positive voltage exceeding its withstanding voltage and destruction, and the capacity thereof is not necessary to have any overcapacity. Thus, the capacity of the first capacitor 4 may be minimized.

Likewise, as a resistance of the variable resistor VR in the second positive charging circuit 9 is increased, a inclining slope of a voltage V2 charged in the second capacitor 5 by a positive half cycle voltage in a positive direction becomes gentle and the conductive angle of the main bidirectional switching element 2a including the auxiliary bidirectional switching element 2b becomes small. As the conductive angle becomes zero and the resistance of the variable resistor VR is further increased, the terminal voltage V2 of the second capacitor 5 does not reach any positive voltage but increases in a negative direction.

When the terminal voltage in a negative direction of the second capacitor 5 becomes larger than the Zener voltage of the Zener diode ZD2, the Zener diode ZD2 conducts and the voltage charged in the capacitor 5 in the negative direction is discharged through the diode D6 and the Zener diode ZD2. As a result, the second capacitor 5 is free from being charged with a negative voltage exceeding its withstanding voltage and destruction, and the capacity thereof is not necessary to have any overcapacity. Thus, the capacity of the second capacitor 5 may be minimized.

Figure 13:
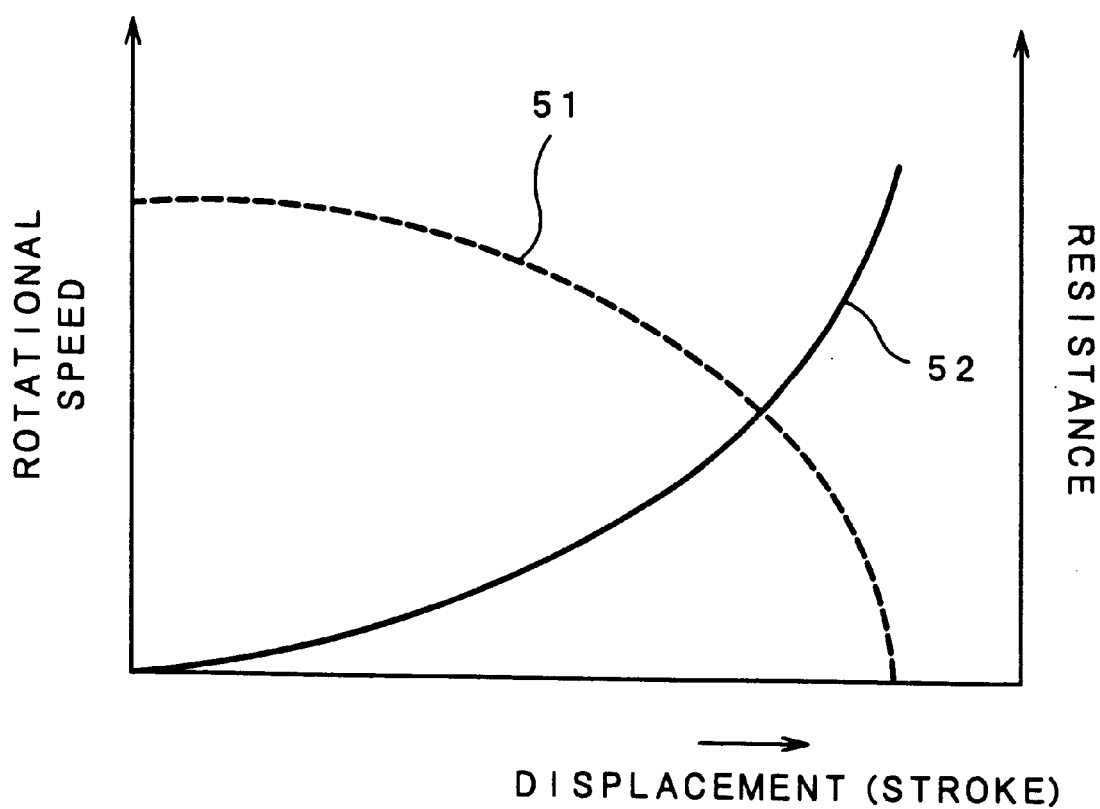
FIG. 13 shows the relation between a variable resistance and a rotational speed of an electric motor controlled by the motor control device of FIG. 12.

If the variable resistor VR is variably manipulated, the combined resistance of the variable resistor VR and the resister R3 logarithmically varies as shown in a curve 51 of FIG. 13. Thus, by manipulating the variable resistor VR the rotational speed of the AC motor has downwardly curved characteristics as shown in a curve 52 of FIG. 13. The speed change ratio of the AC motor 3 when it starts is small and slowly increases. Thus, the motor control device of this embodiment is suitably used for a power tool for screwing bolts fixing their positions.

The power circuit of the AC motor 3 is represented by the bidirectional switching element 2 having the two step construction of the main bidirectional switching element 2a and the auxiliary bidirectional switching element 2b to turn on the main bidirectional switching element 2a, so that the gate current in the bidirectional switching element is minimized and the current consumed by the resistor R3, the variable resistor VR, and transistors Q1 and Q2 in the charging circuit is minimized, reducing their heat.

Figure 14:
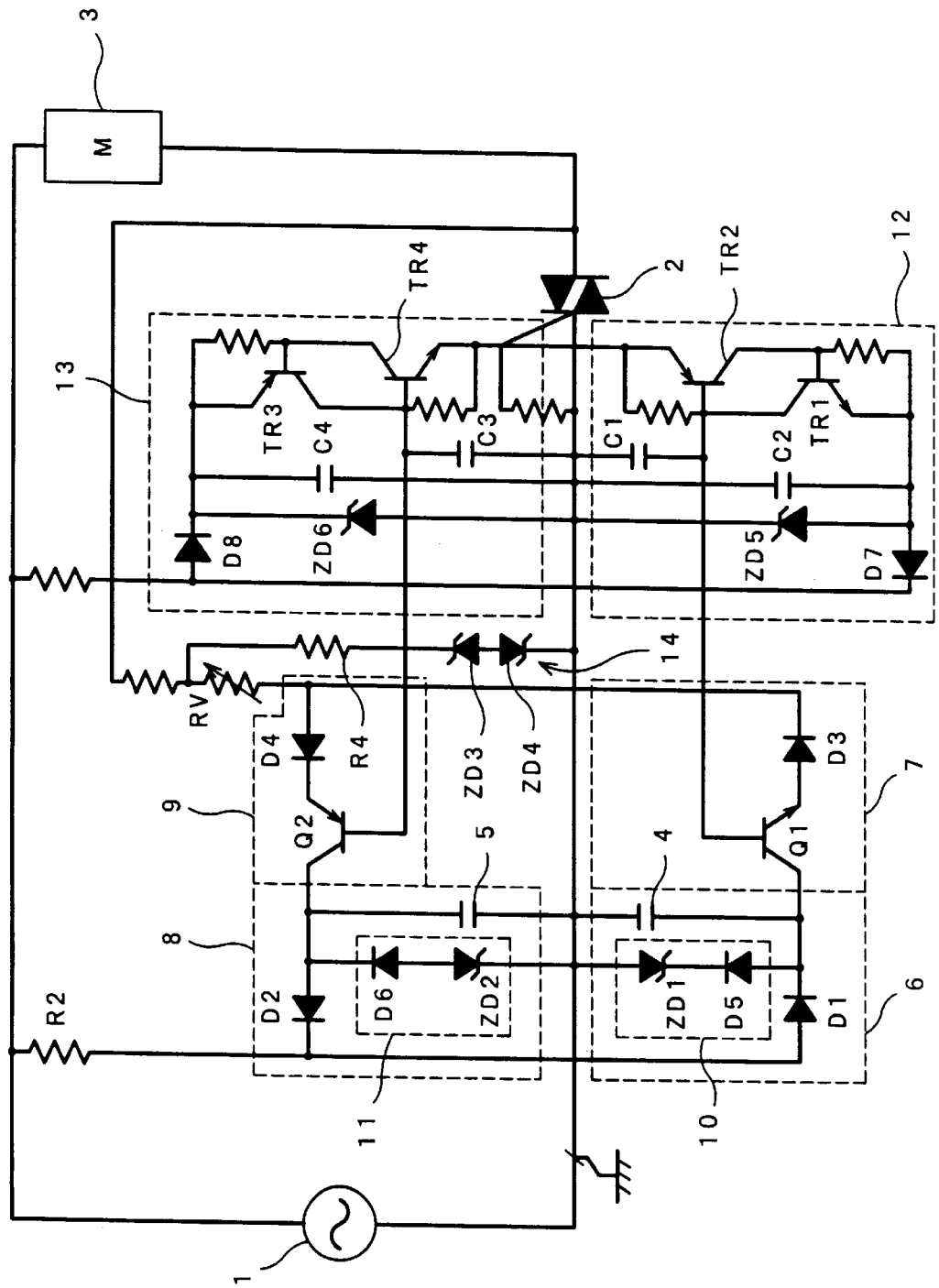
FIG. 14 is a circuit block diagram of a motor control device as a seventh embodiment of this invention.
Figure 15A:
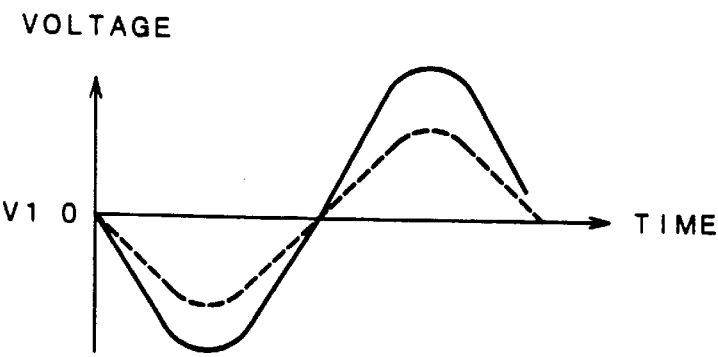
FIG. 15 shows at (a) to (e) wave forms at various points of the motor control device of FIG. 14.
Figure 15B:
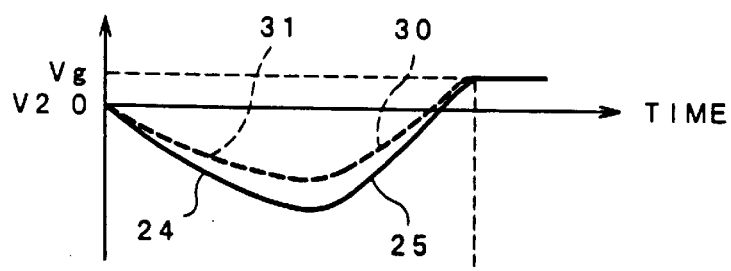
Figure 15C:
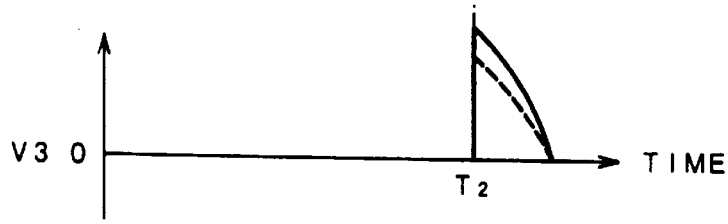
Figure 15D:
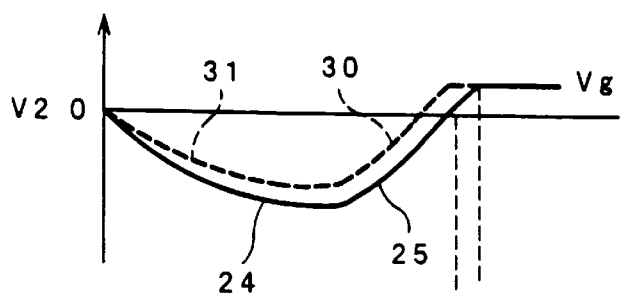
Figure 15E:
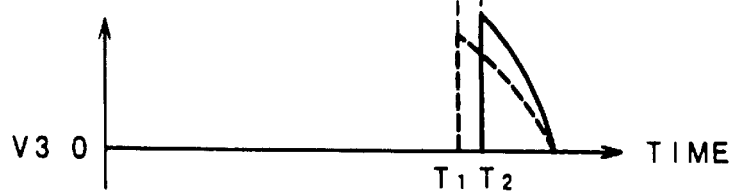
Figure 16:
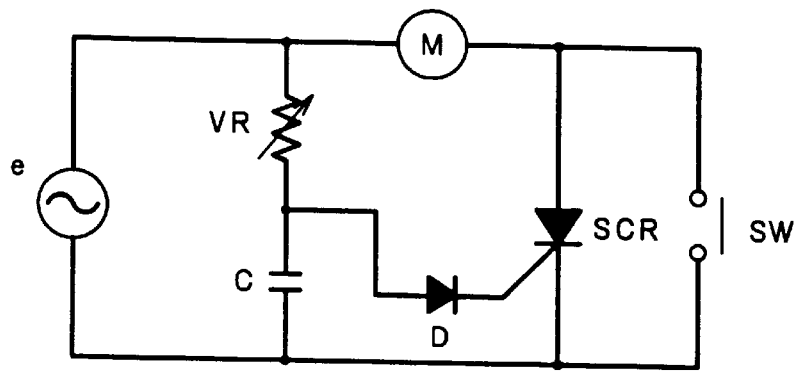
FIG. 16 is a circuit block diagram of a conventional motor control device for controlling a rotational speed of an AC motor employed in power tools.
Figure 17:
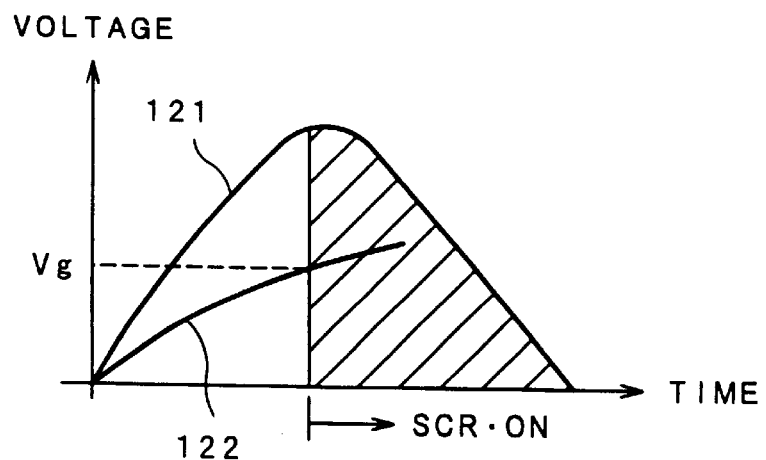
FIG. 17 shows a wave form explaining an operation in the conventional motor control device.
Figure 18A:
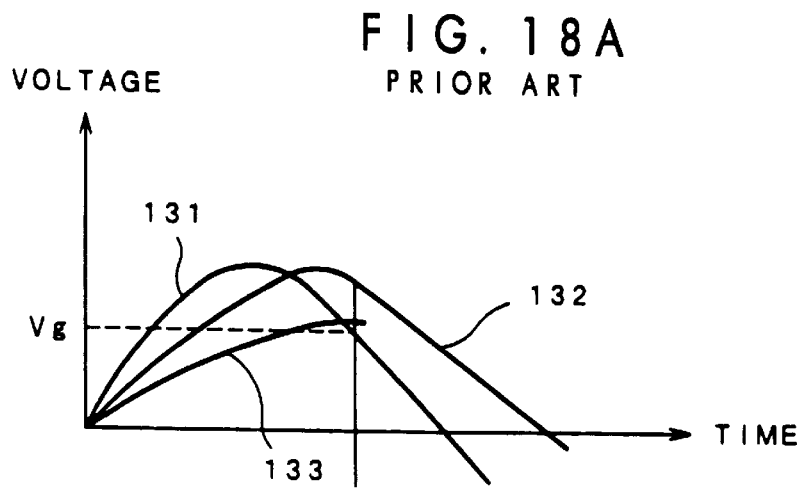
FIG. 18 shows at (a) to (c) wave forms at various points of the motor control device of FIG. 16.
Figure 18B:
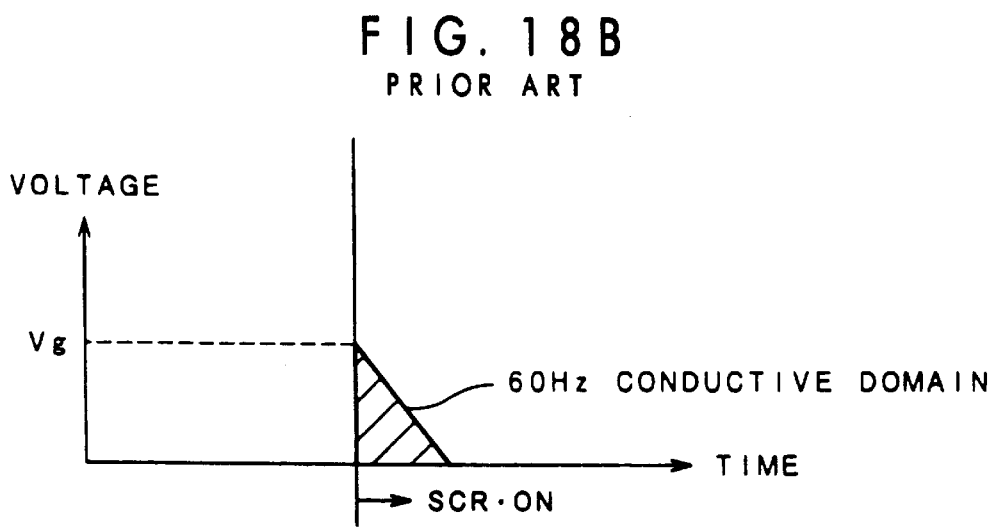
Figure 18C:
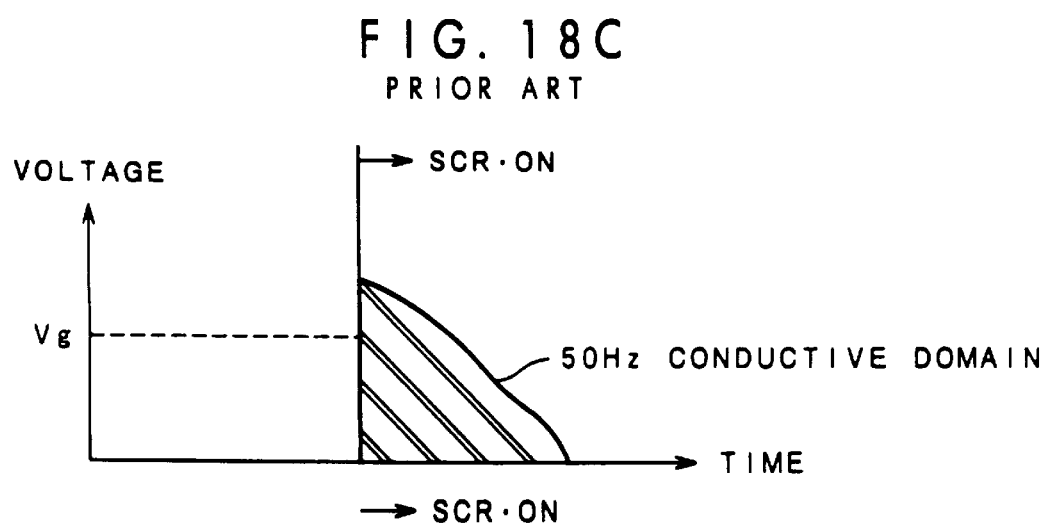
Figure 19:
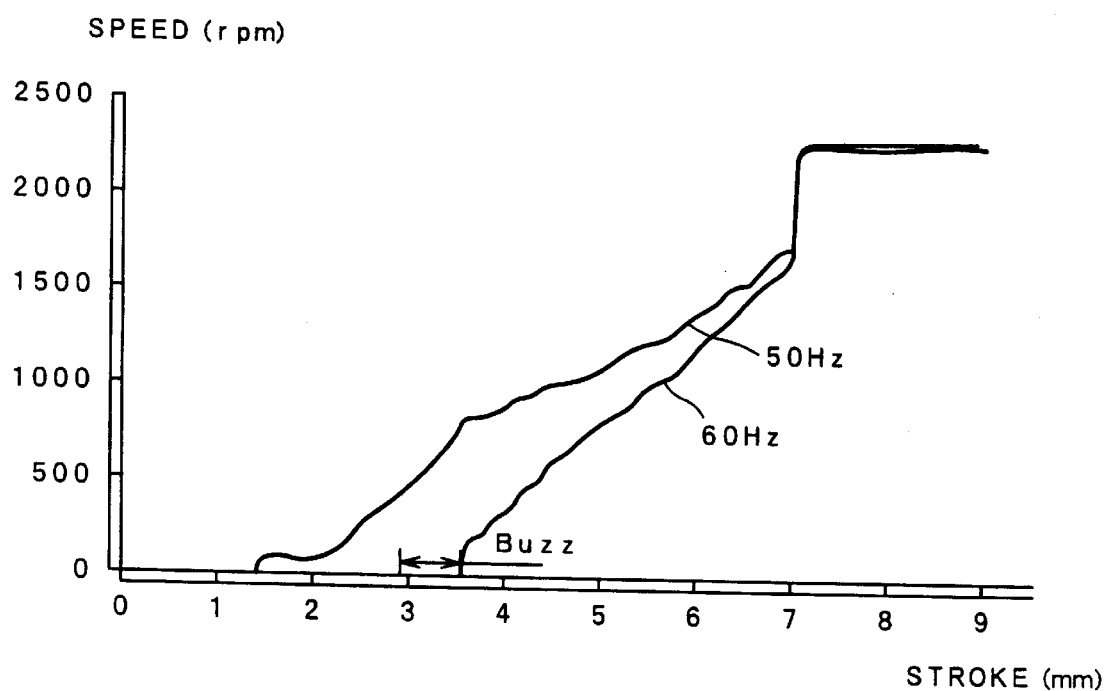
FIG. 19 shows the relation between a stroke and a rotational speed of an electric motor controlled by the conventional motor control device of FIG. 16.

FIG. 14 is a circuit block diagram of a motor control device as a seventh embodiment of this invention, the components corresponding to those of FIGS. 9 and 12 are given by the same reference symbols, and the explanation about their construction and operations except different components will be omitted.

As shown in FIG. 14, this seventh embodiment is characterized in that first and second gate limiter circuits 12 and 13 are employed for triggering a bidirectional switching element 2, and a common constant voltage circuit 14 is disposed for first negative and second positive charging circuits 7 and 9.

The first gate-trigger circuit 12 includes an NPN transistor TR1, a PNP transistor TR2, capacitors C1 and C2, a diode D7 and a Zener diode ZD5, and is conducted by a voltage charged in a first capacitor 4 in the first negative charging circuit 7 to trigger the bidirectional switching element 2 in a negative half cycle. The second gate-trigger circuit 13 includes an PNP transistor TR3, a NPN transistor TR4, capacitors C3 and C4, a diode D8 and a Zener diode ZD6, and is conducted by a voltage charged in a second capacitor 5 in the second positive charging circuit 9 to trigger the bidirectional switching element 2 in a positive half cycle.

The constant voltage circuit 14 includes Zener diodes ZD3 and ZD4 connected in series with opposite polarities and is connected between a ground terminal of the power supply 1 and one terminal of the variable resistor RV through a resistor R4, which charges the first capacitor 4 in a positive direction and the second capacitor 5 in a negative direction with a constant voltage when the voltage of the power supply 1 drops.

An operation of the constant voltage circuit 14 will be described hereinafter. Unless there is disposed the constant voltage circuit 14 in the second negative charging circuit 8 and the second positive charging circuit 9, when the voltage V1 of the power supply 1 drops from a solid line curve to a broken line curve as shown in FIG. 15 at (a), a slope of a charging curve 31 of the capacitor 5 in a negative direction becomes gentle and a charging curve 30 in a positive direction also becomes gentle, but the time point T2 when the voltage V2 charged in a positive direction reaches a gate-trigger voltage V2 remains same even if the voltage of the power supply drops.

A voltage V3 supplied to the AC motor 3 is in a conductive domain depicted by a solid line of FIG. 15 (c) when the thyristor is turned on at the time point T2 where the power supply voltage is high, but small in a conductive domain depicted by a broken line of FIG. 15 (c) when the power supply voltage is low. As a result, the rotational speed of the AC motor in the low supply voltage becomes lower than that in the high supply voltage.

When the constant voltage circuit 14 is employed, the voltage charged in the capacitor 5 is regulated to constant by the Zener diode ZD3 and the resistor R4 whereby the capacitor 5 is charged by a constant voltage in a positive direction even when the power supply voltage drops. Accordingly, the slope of the charging curve 30 in a positive direction in the capacitor 5 when the power supply voltage is low has the same as that of the charging curve 25 in the positive direction in the capacitor 5 when the power supply voltage is high, the time point T1 when the charged voltage V2 in the positive direction reaches the gate-trigger voltage Vg of the bidirectional switching element 2 when the power supply voltage is low becomes earlier than the time point T2. As a result, as shown in FIG. 15 (d), the conductive domain depicted in a broken line when the power supply voltage is low is the same as that depicted in a solid line when the power supply voltage is high. Accordingly, any reduction of the rotational speed of the AC motor in this embodiment is prevented even when the power supply voltage drops.

Thus function of the constant voltage circuit 14 is executed in the same manner in the first positive charging circuit 6 and the first negative charging circuit 7, and the rotational speed of the motor is prevented from reduction even if the power supply voltage varies in a decreasing direction.

The first and second gate-trigger circuit 12 and 13 are disposed to trigger the bidirectional switching element 2 in positive and negative half cycles of the power supply 1 so that the gate current is reduced, the current consumed by the charging circuits is small to reduce heat generated thereby.

The bidirectional switching element of this invention is not limited to the TRIAC, but may employ a semiconductor such as a MOS transistor or the like.

Thus, according this invention, the negative charging circuit charges the negative half cycle voltage of the AC power supply in the negative direction for each cycle and the positive charging circuit charges the positive half cycle voltage of the AC power supply in the positive direction from the end of the negative half cycle by the negative charging circuit for each cycle to trigger the switching element when the charged voltage reaches the gate-trigger voltage of the switching element, whereby the conductive angle of the switching element may be corrected in accordance with the variations of power supply frequencies, whereby there can be provided a stable load control little affected by variations of power supply frequencies.

When the limiter circuit is disposed to limit the negative charged voltage in the negative charging circuit, any negative voltage exceeding a withstanding voltage of the negative charging circuit is avoided to be charged, whereby the negative charging circuit is protected from destruction and the capacity of the circuit can be minimized.

When the constant voltage circuit is disposed to keep the current constant which charges the positive charging circuit in a positive direction when the voltage of the AC power supply drops, the power supplied to the load can be stably controlled independently of variations of the power supply voltage even when the supply voltage is varied in a decreasing direction.

When the positive charging circuit includes a circuit logarithmically changing a resistance value including the same of the variable resistor, the driving characteristics of the load may be non-linear. If the load is an AC motor, the rotational speed of the motor is provided with downwardly curved characteristics in which the ratio of speed at the rise of the motor may be minimized and the manipulation of its power tools may be improved.

When the switching element is composed of a main switching element for switching a power supply circuit of the load and a auxiliary switching element for turning on the main switching element, the gate current of the switching element is minimized and a current consumed by the positive charging circuit is decreased to reduce its heat.

When the gate-trigger element conducted by a charged voltage of the positive charging circuit is employed to trigger the switching element, the peak-gate current of the switching element is ensured and the current consumed by the positive charging circuit is minimized, reducing its heat.

While the invention has been described and illustrated with respect to certain embodiments which give satisfactory results, it will be understood by those skilled in the art, after understanding the purpose of the invention, that various other changes and modifications may be made without departing from the spirit and scope of the invention.

What is claimed is:

1. A load control device for controlling a current in a load connected with an AC power supply through a switching element, comprising:

a charge storage device;

a negative charging circuit for charging said charge storage device with a negative charge during each negative half cycle of said AC power supply; and a positive charging circuit for releasing the charged voltage stored in said charge storage device during each positive half cycle of said AC power supply and using the charged voltage to trigger said switching element when the charged voltage reaches a trigger voltage of said switching element.

2. A load control device according to claim 1 in which said negative charging circuit includes a limiter circuit for limiting the negative charging voltage.

3. A load control device according to claim 1 or 2 in which said positive charging circuit includes a constant voltage circuit for keeping the current constant which said positive charging circuit charges in a positive direction when the voltage of said AC power supply drops.

4. A load control device according to claim 1 in which said positive charging circuit includes a variable resistance.

5. A load control device according to claim 1 in which said positive charging circuit includes a circuit to logarithmically change a resistance value.

6. A load control device according to claim 1 in which said switching element is comprised of a main switching element for switching a power supply circuit of said load and an auxiliary switching element for turning on said main switching element.

7. A load control device according to claim 1, further including a trigger element which conducts the charging voltage of said positive charging circuit to said switching element.

8. A load control device according to claim 1, wherein said charge storage device is a capacitor to apply a conductive reference voltage to said switching element, in which said negative charging circuit includes a first diode connected in a direction to charge said capacitor with a negative voltage, and said positive charging circuit includes a second diode connected in a second direction to charge said capacitor with a positive voltage and a transistor in which a base terminal is connected with a gate terminal of said switching element.

9. A load control device according to claim 1 wherein said switching element is a bidirectional switching element, and which includes a secondary positive charging circuit for charging in a positive direction in a positive half cycle period of said AC power supply for each cycle to trigger said bidirectional switching element in positive and negative half cycles of said AC power supply, and a secondary negative charging circuit for charging in a negative direction from the end of charge of the positive half cycle by said secondary positive charging circuit in the negative half cycle of said AC power supply for each cycle to trigger said bidirectional switching element when the charged voltage reaches a gate-trigger voltage of said bidirectional switching element.

* * * * *